US010580087B2

(12) United States Patent
Doi

(10) Patent No.: US 10,580,087 B2
(45) Date of Patent: Mar. 3, 2020

(54) BUDGET-MANAGEMENT-DATA CREATING METHOD, BUDGET-MANAGEMENT-DATA CREATING APPARATUS, AND RECORDING MEDIUM

(71) Applicant: FUJITSU LIMITED, Kawasaki-shi, Kanagawa (JP)

(72) Inventor: Kunie Doi, Oota (JP)

(73) Assignee: FUJITSU LIMITED, Kawasaki (JP)

( * ) Notice: Subject to any disclaimer, the term of this patent is extended or adjusted under 35 U.S.C. 154(b) by 547 days.

(21) Appl. No.: 15/334,764

(22) Filed: Oct. 26, 2016

(65) Prior Publication Data

US 2017/0132717 A1 May 11, 2017

(30) Foreign Application Priority Data

Nov. 11, 2015 (JP) ................................ 2015-221668

(51) Int. Cl.
*G06Q 40/00* (2012.01)

(52) U.S. Cl.
CPC .................................... *G06Q 40/12* (2013.12)

(58) Field of Classification Search
CPC ........ G06Q 10/00; G06Q 20/00; G06Q 30/00; G06Q 40/00

(Continued)

(56) References Cited

U.S. PATENT DOCUMENTS 7,029,929 B1 * 4/2006 Lu .......................... H01L 24/78 438/16
7,386,492 B2 * 6/2008 Ginsburg ............. G06Q 10/087 705/28

(Continued)

FOREIGN PATENT DOCUMENTS

JP 6-332920 A 12/1994
JP 8-87545 A 4/1996

(Continued)

OTHER PUBLICATIONS

Allard et al., "Comparative Price and the Design pf Effective Product Communications", Journal of Marketing, vol. 81 (Sep. 2017) 16-29, ISSN: 0022-2429. (Year: 2017).*

(Continued)

*Primary Examiner* — Frantzy Poinvil

(74) *Attorney, Agent, or Firm* — Westerman, Hattori, Daniels & Adrian, LLP; John P. Kong

(57) ABSTRACT

A budget-management-data creating method by a computer includes: accepting designation of a brand for which budget management data is to be created and a total budget amount; creating budget amounts for respective partial periods in a predetermined period, by automatically allocating the total budget amount to the respective partial periods, based on past sales performance data of the designated brand; displaying the created budget amounts to enable acceptance of a correction instruction; proportionally distributing upon accepting a correction of one of the budget amounts, a budget amount reflecting the correction and corresponding to the respective partial periods, the budget amount being proportionally distributed according to a sales ratio of respective item categories corresponding to the brand, the sales ratio corresponding to a corresponding past partial period; and displaying as a budget amount for each of the respective item categories for the respective partial periods, a result of the proportionally distributing.

4 Claims, 24 Drawing Sheets

(58) Field of Classification Search
USPC ........................................................ 705/3–44
See application file for complete search history.

(56) References Cited

U.S. PATENT DOCUMENTS 7,640,179 B1 * 12/2009 Sachedina .............. G06Q 10/06 705/7.31
7,912,747 B2 * 3/2011 Sachedina .............. G06Q 10/06 705/7.31
8,124,238 B2 * 2/2012 Joo ........................ B82Y 10/00 257/40
8,417,556 B2 * 4/2013 Moukas ............. G06Q 10/0631 705/7.29
8,799,095 B2 * 8/2014 Ginsburg ............. G06Q 10/087 705/14.24
2005/0144125 A1 * 6/2005 Erbey .................. G06Q 20/023 705/40
2008/0208707 A1 * 8/2008 Erbey .................. G06Q 20/023 705/26.8
2011/0010278 A1 * 1/2011 Bulman ................. G06Q 40/12 705/30
2011/0202410 A1 * 8/2011 Ginsburg ............. G06Q 10/087 705/14.69
2013/0339177 A1 * 12/2013 Erbey .................. G06Q 20/023 705/26.4
2014/0156392 A1 * 6/2014 Ouimet .................. G06Q 30/02 705/14.49
2014/0258022 A1 * 9/2014 Zamer ................ G06Q 30/0631 705/26.7
2015/0186927 A1 * 7/2015 Chittilappilly ..... G06Q 30/0244 705/14.43

FOREIGN PATENT DOCUMENTS

JP 2004-94943 A 3/2004
JP 2007-293614 A 11/2007
JP 2010-39649 A 2/2010

OTHER PUBLICATIONS www.PrivateLabelByuyer.conn, PL Retailer of the Year Cover Story, PLByuyer Jan. 2011. (Year: 2010).*
Office Action dated May 14, 2019, issued in counterpart JP Application No. 2015-221668, with English machine translation. (6 pages).

* cited by examiner 500-1

| BRAND | SALES | GROSS PROFIT | GROSS PROFIT MARGIN | PURCHASE | SALES-PURCHASE RATIO | INITIAL STOCK |
|---|---|---|---|---|---|---|
| A-Brand | 2,000,000 | 800,000 | 40.00 | 2,200,000 | 110.0 | 0 |
| B-Brand | ... | ... | ... | ... | ... | ... |
| : | : | : | : | : | : | : |

| BRAND | YEAR/SEASON | TARGET GENDER | CATEGORY | PRODUCT NUMBER | |
|---|---|---|---|---|---|
| A-Brand | 2016SS | WOMEN'S | TOPWEAR | T-SHIRT | 600-1 |
| | | | | BLOUSE | 600-2 |
| | | | | KNIT TOP | 600-3 |
| | | | | LONG SLEEVE TOP | 600-4 |
| | | | BOTTOMWEAR | PANTS | |
| | | | | SHIRT | |
| | | | : | : | |
| | | MEN'S | : | : | |
| | 2016AW | ... | ... | ... | |
| | : | : | : | : | |
| B-Brand | ... | ... | ... | ... | |
| ... | ... | ... | ... | ... | |

700-1

| ITEM ATTRIBUTE | YEAR/WEEK | ··· | 2015/21 | 2015/22 | 2015/23 | ··· |
|---|---|---|---|---|---|---|
| A-Brand | SALES RECORDS | ··· | 4,100 | 1,250 | 9,207 | ··· |
| | GROSS PROFIT RECORDS | ··· | 8,366 | 5,650 | 2,863 | ··· |
| | PURCHASE RECORDS | ··· | 1,000 | 3,250 | 2,670 | ··· |
| | STOCK RECORDS | ··· | 3,250 | 2,800 | 3,790 | ··· |
| : | : | : | : | : | : | : |
| A-Brand 2015SS WOMEN'S TOPWEAR | ··· | ··· | ··· | ··· | ··· | ··· |
| : | : | : | : | : | : | : |
| B-Brand | ··· | ··· | ··· | ··· | ··· | ··· |
| : | : | : | : | : | : | : |

FIG.8

PROPORTIONAL-DISTRIBUTION INFORMATION TABLE 250

800-1

| ITEM ATTRIBUTE | YEAR/WEEK | | ... | 2016/12 | 2016/13 | 2016/14 | ... |
|---|---|---|---|---|---|---|---|
| A-Brand | SALES | INITIAL | ... | 600 | 30,400 | 53,600 | ... |
| | | CORREC-TION | ... | - | 20,000 | - | ... |
| | GROSS PROFIT | INITIAL | ... | 1,120 | 12,960 | 23,040 | ... |
| | | CORREC-TION | ... | - | - | - | ... |
| | PUR-CHASE | INITIAL | ... | 660 | 33,440 | 58,960 | ... |
| | | CORREC-TION | ... | - | - | - | ... |
| | STOCK | INITIAL | ... | 5,320 | 8,360 | 13,720 | ... |
| | | CORREC-TION | ... | - | - | - | ... |
| : | : | | : | : | : | : | : |
| A-Brand 2015SS WOMEN'S TOPWEAR | ... | | ... | ... | ... | ... | ... |
| : | : | | : | : | : | : | : |

260

900-1

| ITEM ATTRIBUTE | ORDER FLAG | YEAR/WEEK | ... | 2016/12 | 2016/13 | 2016/14 | ... |
|---|---|---|---|---|---|---|---|
| A-Brand | 0 | SALES | ... | 600 | 20,000 | 53,600 | ... |
| | | GROSS PROFIT | ... | 1,120 | 12,960 | 23,040 | ... |
| | | PURCHASE | ... | 660 | 33,440 | 58,960 | ... |
| | | STOCK | ... | 5,320 | 8,360 | 13,720 | ... |
| ... | ... | ... | ... | ... | ... | ... | ... |
| A-Brand 2016SS WOMEN'S | ... | ... | ... | ... | ... | ... | ... |
| ... | ... | ... | ... | ... | ... | ... | ... |
| A-Brand 2015SS WOMEN'S TOPWEAR | ... | ... | ... | ... | ... | ... | ... |
| ... | ... | ... | ... | ... | ... | ... | ... |

| BRAND | YEAR | SALES BUDGET |
|---|---|---|
| B-Brand | 2016 | 65,500 |

| SALES RECORDS | | COMPOSITION RATIO | AFTER FRACTION ADJUSTMENT | BUDGET FOR YEAR 2016 | BUDGET AFTER FRACTION ADJUSTMENT |
|---|---|---|---|---|---|
| MONTH | YEAR 2015 | | | | |
| MARCH | 32,000 | 5.36 | 5.36 | 3,511 | 3,511 |
| APRIL | 38,000 | 6.37 | 6.37 | 4,172 | 4,172 |
| MAY | 48,000 | 8.04 | 8.04 | 5,266 | 5,266 |
| JUNE | 70,000 | 11.73 | 11.73 | 7,683 | 7,683 |
| JULY | 66,000 | 11.06 | 11.06 | 7,244 | 7,244 |
| AUGUST | 52,000 | 8.71 | 8.71 | 5,705 | 5,705 |
| SEPTEMBER | 29,000 | 4.86 | 4.86 | 3,183 | 3,183 |
| OCTOBER | 26,000 | 4.36 | 4.36 | 2,856 | 2,856 |
| NOVEMBER | 28,000 | 4.69 | 4.69 | 3,072 | 3,072 |
| DECEMBER | 62,000 | 10.39 | 10.39 | 6,805 | 6,805 |
| JANUARY | 70,000 | 11.73 | 11.73 | 7,683 | 7,683 |
| FEBRUARY | 76,000 | 12.73 | 12.70 | 8,318 | 8,320 |
| TOTAL | 597,000 | 100.03 | 100.00 | 65,498 | 65,500 |

FIG.13

| BRAND | YEAR | SALES BUDGET |
|---|---|---|
| B-Brand | 2016 | 65,500 |

| SALES RECORDS | | | | THREE-YEAR TOTAL | AVERAGE | SEASONAL INDEX | COMPOSITION RATIO | AFTER FRACTION ADJUSTMENT | BUDGET FOR YEAR 2016 | BUDGET AFTER FRACTION ADJUSTMENT |
|---|---|---|---|---|---|---|---|---|---|---|
| MONTH | YEAR 2013 | YEAR 2014 | YEAR 2015 | | | | | | | |
| MARCH | 30,000 | 32,000 | 32,000 | 94,000 | 31,333 | 63.09 | 5.26 | 5.26 | 3,445 | 3,445 |
| APRIL | 36,000 | 39,000 | 38,000 | 113,000 | 37,667 | 75.84 | 6.32 | 6.32 | 4,140 | 4,140 |
| MAY | 42,000 | 46,000 | 48,000 | 136,000 | 45,333 | 91.27 | 7.61 | 7.61 | 4,985 | 4,985 |
| JUNE | 77,000 | 78,000 | 70,000 | 225,000 | 75,000 | 151.01 | 12.58 | 12.58 | 8,240 | 8,240 |
| JULY | 56,000 | 62,000 | 66,000 | 184,000 | 61,333 | 123.49 | 10.29 | 10.29 | 6,740 | 6,740 |
| AUGUST | 48,000 | 54,000 | 52,000 | 154,000 | 51,333 | 103.36 | 8.61 | 8.61 | 5,640 | 5,640 |
| SEPTEMBER | 32,000 | 34,000 | 29,000 | 95,000 | 31,667 | 63.76 | 5.31 | 5.31 | 3,478 | 3,478 |
| OCTOBER | 26,000 | 28,000 | 26,000 | 80,000 | 26,667 | 53.69 | 4.47 | 4.47 | 2,928 | 2,928 |
| NOVEMBER | 29,000 | 30,000 | 28,000 | 87,000 | 29,000 | 58.39 | 4.87 | 4.87 | 3,190 | 3,190 |
| DECEMBER | 60,000 | 63,000 | 62,000 | 185,000 | 61,667 | 124.16 | 10.35 | 10.35 | 6,779 | 6,779 |
| JANUARY | 66,000 | 72,000 | 70,000 | 208,000 | 69,333 | 139.60 | 11.63 | 11.63 | 7,618 | 7,618 |
| FEBRUARY | 73,000 | 78,000 | 76,000 | 227,000 | 75,667 | 152.35 | 12.70 | 12.70 | 8,319 | 8,317 |
| TOTAL | 575,000 | 616,000 | 597,000 | 1,788,000 | 596,000 | 1,200.01 | 100.00 | 100.00 | 65,502 | 65,500 |
| | | | | AVERAGE | 49,667 | | | | | |

FIG.14

| BRAND | YEAR | SALES BUDGET |
|---|---|---|
| B-Brand | 2016 | 65,500 |

| SALES RECORDS | | | | THREE-YEAR MEDIANS | SEASONAL INDEX | COMPOSITION RATIO | AFTER FRACTION ADJUSTMENT | BUDGET FOR YEAR 2016 | BUDGET AFTER FRACTION ADJUSTMENT |
|---|---|---|---|---|---|---|---|---|---|
| MONTH | YEAR 2013 | YEAR 2014 | YEAR 2015 | | | | | | |
| MARCH | 30,000 | 32,000 | 32,000 | 32,000 | 63.79 | 5.32 | 5.32 | 3,485 | 3,485 |
| APRIL | 36,000 | 39,000 | 38,000 | 38,000 | 75.75 | 6.31 | 6.31 | 4,133 | 4,133 |
| MAY | 42,000 | 46,000 | 48,000 | 46,000 | 91.69 | 7.64 | 7.64 | 5,004 | 5,004 |
| JUNE | 77,000 | 78,000 | 70,000 | 77,000 | 153.49 | 12.79 | 12.78 | 8,371 | 8,369 |
| JULY | 56,000 | 62,000 | 66,000 | 62,000 | 123.59 | 10.30 | 10.30 | 6,747 | 6,747 |
| AUGUST | 48,000 | 54,000 | 52,000 | 52,000 | 103.65 | 8.64 | 8.64 | 5,659 | 5,659 |
| SEPTEMBER | 32,000 | 34,000 | 29,000 | 32,000 | 63.79 | 5.32 | 5.32 | 3,485 | 3,485 |
| OCTOBER | 26,000 | 28,000 | 26,000 | 26,000 | 51.83 | 4.32 | 4.32 | 2,830 | 2,830 |
| NOVEMBER | 29,000 | 30,000 | 28,000 | 29,000 | 57.81 | 4.82 | 4.82 | 3,157 | 3,157 |
| DECEMBER | 60,000 | 63,000 | 62,000 | 62,000 | 123.59 | 10.30 | 10.30 | 6,747 | 6,747 |
| JANUARY | 66,000 | 72,000 | 70,000 | 70,000 | 139.53 | 11.63 | 11.63 | 7,618 | 7,618 |
| FEBRUARY | 73,000 | 78,000 | 76,000 | 76,000 | 151.50 | 12.62 | 12.62 | 8,266 | 8,266 |
| TOTAL | 575,000 | 616,000 | 597,000 | 602,000 | 1,200.01 | 100.01 | 100.00 | 65,502 | 65,500 |
| | | | AVERAGE | 50,167 | | | | | |

FIG.15

| BRAND | GROSS PROFIT MARGIN | SALES BUDGET | GROSS PROFIT BUDGET |
|---|---|---|---|
| B-Brand | 55% | 655,000 | 360,250 |

| YEAR | MONTH | SALES BUDGET | ACTUAL GROSS PROFIT MARGIN | GROSS PROFIT BUDGET (PROVISONAL) | COMPOSITION RATIO | AFTER FRACTION ADJUSTMENT | GROSS PROFIT BUDGET | GROSS PROFIT BUDGET AFTER FRACTION ADJUSTMENT | GROSS PROFIT MARGIN |
|---|---|---|---|---|---|---|---|---|---|
| 2016 | 3 | 34,519 | 40% | 13,808 | 4.63 | 4.63 | 16,680 | 16,680 | 48% |
| 2016 | 4 | 41,527 | 30% | 12,458 | 4.18 | 4.18 | 15,058 | 15,058 | 36% |
| 2016 | 5 | 49,060 | 60% | 29,436 | 9.87 | 9.87 | 35,557 | 35,557 | 72% |
| 2016 | 6 | 83,510 | 50% | 41,755 | 14.01 | 14.01 | 50,471 | 50,471 | 60% |
| 2016 | 7 | 66,024 | 45% | 29,711 | 9.97 | 9.97 | 35,917 | 35,917 | 54% |
| 2016 | 8 | 56,920 | 30% | 17,076 | 5.73 | 5.73 | 20,642 | 20,642 | 36% |
| 2016 | 9 | 36,156 | 50% | 18,078 | 6.06 | 6.06 | 21,831 | 21,831 | 60% |
| 2016 | 10 | 29,803 | 70% | 20,862 | 7.00 | 7.00 | 25,218 | 25,218 | 85% |
| 2016 | 11 | 32,226 | 30% | 9,668 | 3.24 | 3.24 | 11,672 | 11,672 | 36% |
| 2016 | 12 | 67,007 | 40% | 26,803 | 8.99 | 8.99 | 32,386 | 32,386 | 48% |
| 2016 | 1 | 75,718 | 60% | 45,431 | 15.24 | 15.25 | 54,938 | 54,938 | 73% |
| 2016 | 2 | 82,530 | 40% | 33,012 | 11.07 | 11.07 | 39,880 | 39,880 | 48% |
| | | 655,000 | 0% | 298,098 | 99.99 | 100.00 | 360,250 | 360,250 | 55% |

FIG.16

| BRAND | SALES-PURCHASE RATIO | PURCHASE BUDGET |
|---|---|---|
| B-Brand | 115% | 753,250 |

| YEAR | MONTH | SALES BUDGET | ACTUAL SALES-PURCHASE RATIO | PURCHASE BUDGET (PROVISONAL) | COMPOSI-TION RATIO | AFTER FRACTION ADJUSTMENT | PURCHASE BUDGET | GROSS PROFIT BUDGET AFTER FRACTION ADJUSTMENT | SALES-PURCHASE RATIO |
|---|---|---|---|---|---|---|---|---|---|
| 2016 | 3 | 34,519 | 120% | 41,423 | 5.70 | 5.70 | 42,935 | 42,935 | 124% |
| 2016 | 4 | 41,527 | 134% | 55,646 | 7.65 | 7.65 | 57,624 | 57,624 | 139% |
| 2016 | 5 | 49,060 | 110% | 53,966 | 7.42 | 7.42 | 55,891 | 55,891 | 114% |
| 2016 | 6 | 83,510 | 105% | 87,686 | 12.06 | 12.05 | 90,767 | 90,768 | 109% |
| 2016 | 7 | 66,024 | 123% | 81,210 | 11.17 | 11.17 | 84,138 | 84,138 | 127% |
| 2016 | 8 | 56,920 | 118% | 67,166 | 9.24 | 9.24 | 69,600 | 69,600 | 122% |
| 2016 | 9 | 36,156 | 112% | 40,495 | 5.57 | 5.57 | 41,956 | 41,956 | 116% |
| 2016 | 10 | 29,803 | 108% | 32,187 | 4.43 | 4.43 | 33,369 | 33,369 | 112% |
| 2016 | 11 | 32,226 | 121% | 38,993 | 5.36 | 5.36 | 40,374 | 40,374 | 125% |
| 2016 | 12 | 67,007 | 105% | 70,357 | 9.67 | 9.67 | 72,839 | 72,839 | 109% |
| 2016 | 1 | 75,718 | 102% | 77,232 | 10.62 | 10.62 | 79,995 | 79,995 | 106% |
| 2016 | 2 | 82,530 | 98% | 80,879 | 11.12 | 11.12 | 83,761 | 83,761 | 101% |
| | | 655,000 | | 727,240 | 100.01 | 100.00 | 753,249 | 753,250 | 115% |

FIG.17

| BRAND | YEAR |
|---|---|
| B-Brand | 2016 |

| STOCK RECORD IN YEAR 2015 | MONTH | SALES BUDGET FOR YEAR 2016 | SEASONAL INDEX | (1+SEASONAL INDEX)/2 | MONTHLY INITIAL STOCK BUDGET |
|---|---|---|---|---|---|
| 32,000 | 3 | 34,519 | 63.24 | 81.62 | 40,606 |
| 38,000 | 4 | 41,527 | 76.08 | 88.04 | 43,800 |
| 48,000 | 5 | 49,060 | 89.88 | 94.94 | 47,233 |
| 70,000 | 6 | 83,510 | 153.00 | 126.50 | 62,934 |
| 66,000 | 7 | 66,024 | 120.96 | 110.48 | 54,964 |
| 52,000 | 8 | 56,920 | 104.28 | 102.14 | 50,815 |
| 29,000 | 9 | 36,156 | 66.24 | 83.12 | 41,352 |
| 26,000 | 10 | 29,803 | 54.60 | 77.30 | 38,457 |
| 28,000 | 11 | 32,226 | 59.04 | 79.52 | 39,561 |
| 62,000 | 12 | 67,007 | 122.76 | 111.38 | 55,412 |
| 70,000 | 1 | 75,718 | 138.72 | 119.36 | 59,382 |
| 76,000 | 2 | 82,530 | 151.20 | 125.60 | 62,486 |
| 597,000 | TOTAL | 655,000 | | | |
| 49,750 | AVERAGE | 54,583 | | | |

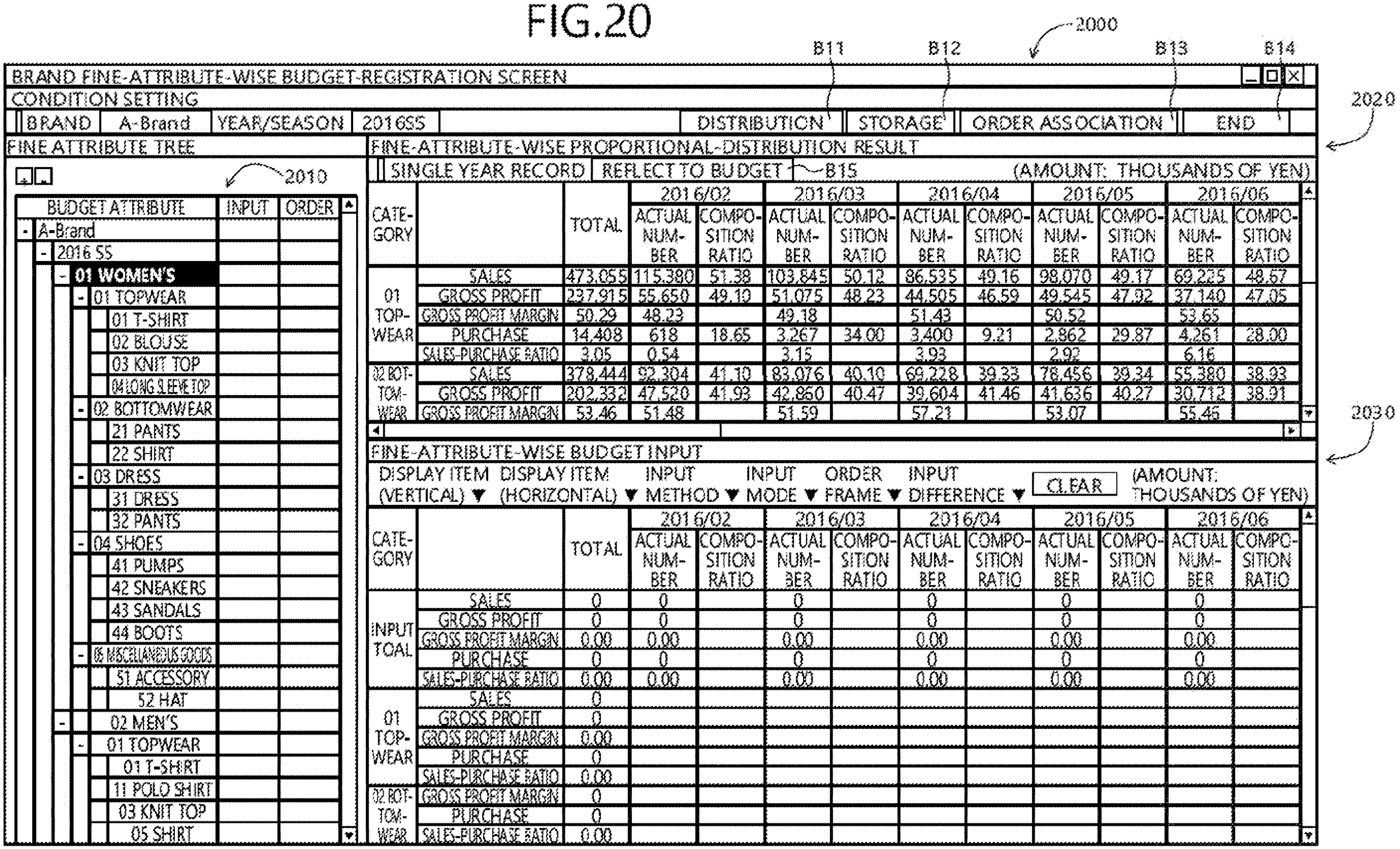

FIG.20

BRAND FINE-ATTRIBUTE-WISE BUDGET-REGISTRATION SCREEN

CONDITION SETTING

| BRAND | A-Brand | YEAR/SEASON | 2016SS | | DISTRIBUTION | STORAGE | ORDER ASSOCIATION | END |

FINE ATTRIBUTE TREE (2010)

| BUDGET ATTRIBUTE | INPUT | ORDER |
|---|---|---|
| A-Brand | | |
| 2016 SS | | |
| 01 WOMEN'S | | |
| 01 TOPWEAR | | |
| 01 T-SHIRT | | |
| 02 BLOUSE | | |
| 03 KNIT TOP | | |
| (ILLEGIBLE) SLEEVE TOP | | |
| 02 BOTTOMWEAR | | |
| 21 PANTS | | |
| 22 SHIRT | | |
| 03 DRESS | | |
| 31 DRESS | | |
| 32 PANTS | | |
| 04 SHOES | | |
| 41 PUMPS | | |
| 42 SNEAKERS | | |
| 43 SANDALS | | |
| 44 BOOTS | | |
| 05 MISCELLANEOUS GOODS | | |
| 51 ACCESSORY | | |
| 52 HAT | | |
| 02 MEN'S | | |
| 01 TOPWEAR | | |
| 01 T-SHIRT | | |
| 11 POLO SHIRT | | |
| 03 KNIT TOP | | |
| 05 SHIRT | | |

FINE-ATTRIBUTE-WISE PROPORTIONAL-DISTRIBUTION RESULT (2020)

REFLECT TO BUDGET  B15

SINGLE YEAR RECORD (AMOUNT: THOUSANDS OF YEN)

| CATE-GORY | | TOTAL | 2016/02 | | 2016/03 | | 2016/04 | | 2016/05 | | 2016/06 | |
|---|---|---|---|---|---|---|---|---|---|---|---|---|
| | | | ACTUAL NUM-BER | COMPO-SITION RATIO | ACTUAL NUM-BER | COMPO-SITION RATIO | ACTUAL NUM-BER | COMPO-SITION RATIO | ACTUAL NUM-BER | COMPO-SITION RATIO | ACTUAL NUM-BER | COMPO-SITION RATIO |
| | SALES | 473,055 | 115,380 | 51.38 | 103,845 | 50.12 | 86,535 | 49.16 | 98,070 | 49.17 | 69,225 | 48.57 |
| 01 TOP-WEAR | GROSS PROFIT | 227,915 | 55,650 | 49.19 | 51,075 | 48.23 | 44,505 | 46.59 | 49,545 | 47.92 | 37,140 | 47.05 |
| | GROSS PROFIT MARGIN | 50.29 | 48.23 | | 49.18 | | 51.43 | | 50.52 | | 53.65 | |
| | PURCHASE | 14,408 | 618 | 18.65 | 3,267 | 34.00 | 3,400 | 9.21 | 2,862 | 29.87 | 4,261 | 28.00 |
| | SALES-PURCHASE RATIO | 3.05 | 0.54 | | 3.15 | | 3.93 | | 2.92 | | 6.16 | |
| | SALES | 278,444 | 92,304 | 41.10 | 83,076 | 40.10 | 69,228 | 39.33 | 78,456 | 39.34 | 55,380 | 38.93 |
| 02 BOT-TOM-WEAR | GROSS PROFIT | 202,332 | 47,520 | 41.93 | 42,860 | 40.47 | 39,604 | 41.46 | 41,636 | 40.27 | 30,712 | 38.91 |
| | GROSS PROFIT MARGIN | 53.46 | 51.48 | | 51.59 | | 57.21 | | 53.07 | | 55.46 | |

FINE-ATTRIBUTE-WISE BUDGET INPUT (2030)

DISPLAY ITEM ▼ (VERTICAL) ▼  DISPLAY ITEM ▼ (HORIZONTAL) ▼  INPUT METHOD ▼  INPUT MODE ▼  ORDER FRAME ▼  INPUT DIFFERENCE ▼   CLEAR   (AMOUNT: THOUSANDS OF YEN)

| CATE-GORY | | TOTAL | 2016/02 | | 2016/03 | | 2016/04 | | 2016/05 | | 2016/06 | |
|---|---|---|---|---|---|---|---|---|---|---|---|---|
| | | | ACTUAL NUM-BER | COMPO-SITION RATIO | ACTUAL NUM-BER | COMPO-SITION RATIO | ACTUAL NUM-BER | COMPO-SITION RATIO | ACTUAL NUM-BER | COMPO-SITION RATIO | ACTUAL NUM-BER | COMPO-SITION RATIO |
| INPUT TOTAL | SALES | 0 | 0 | 0.00 | 0 | 0.00 | 0 | 0.00 | 0 | 0.00 | 0 | 0.00 |
| | GROSS PROFIT | 0 | 0 | 0.00 | 0 | 0.00 | 0 | 0.00 | 0 | 0.00 | 0 | 0.00 |
| | GROSS PROFIT MARGIN | 0.00 | | | | | | | | | | |
| | PURCHASE | 0 | 0 | 0.00 | 0 | 0.00 | 0 | 0.00 | 0 | 0.00 | 0 | 0.00 |
| | SALES-PURCHASE RATIO | 0.00 | | | | | | | | | | |
| 01 TOP-WEAR | SALES | | | | | | | | | | | |
| | GROSS PROFIT | | | | | | | | | | | |
| | GROSS PROFIT MARGIN | | | | | | | | | | | |
| | PURCHASE | | | | | | | | | | | |
| | SALES-PURCHASE RATIO | | | | | | | | | | | |
| 02 BOT-TOM-WEAR | | | | | | | | | | | | |

BUDGET-MANAGEMENT-DATA CREATING METHOD, BUDGET-MANAGEMENT-DATA CREATING APPARATUS, AND RECORDING MEDIUM

CROSS REFERENCE TO RELATED APPLICATIONS

This application is based upon and claims the benefit of priority of the prior Japanese Patent Application No. 2015-221668, filed on Nov. 11, 2016, the entire contents of which are incorporated herein by reference.

FIELD

The embodiments discussed herein relate to a budget-management-data creating method, a budget-management-data creating apparatus, and a recording medium.

BACKGROUND

In companies, it is important to develop a mid- and long-term business plan and, based on the developed business plan, it is also important to develop a budget plan as to what, by when, and to what extent the plan is achieved. A budget plan is developed, for example, by creating weekly or monthly budgets for each item category based on an annual business budget.

Conventional techniques include, for example, a technique of supporting management decision-making based on a business policy and corporate identity selected by the management of the corporation; a technique of referring to store-wise, item-wise, and department-wise sales records to create store-wise, item-wise, and department-wise sales plans for the next month, and allocating the store-wise, item-wise, and department-wise sales plans corrected and confirmed by a drafter to respective stores, thereby creating item-wise and department-wise sales plans for each store.

There is also a technique of calculating the total items already ordered from orders already placed and a unit price of each item to be adjusted, and calculating a target adjustment total from the already ordered total and a purchase budget amount, thereby adjusting safety stock of each item according to the target adjustment total. Further, there is a technique for performing sales management and item order management of an automatic vending machine that can sell items by electronic payment. For example, refer to Japanese Laid-Open Patent Publication Nos. 2004-94943, H6-332920, 2010-39649, and 2007-293614.

SUMMARY

According to an aspect of an embodiment, a budget-management-data creating method includes accepting, by a computer, designation of a brand for which budget management data is to be created and designation of a total budget amount; creating, by the computer, budget amounts for respective partial periods in a predetermined period, the budget amounts for the respective partial periods being a result of automatically allocating the total budget amount to the respective partial periods, based on past sales performance data of the designated brand; displaying, by the computer, the created budget amounts corresponding to the respective partial periods such that a correction instruction may be accepted; proportionally distributing, by the computer upon accepting a correction of one of the budget amounts for the respective partial periods, a budget amount reflecting the correction and corresponding to the respective partial periods, the budget amount being proportionally distributed according to a sales ratio of respective item categories corresponding to the brand, the sales ratio corresponding to a corresponding past partial period; and displaying, by the computer as a budget amount for each of the respective item categories for the respective partial periods, a result of the proportionally distributing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram depicting an example of storage contents of a proportional-distribution information table 250;

FIG. 13 is an explanatory diagram (part 2) depicting a calculation example of a proportional distribution calculation for a sales budget;

FIG. 14 is an explanatory diagram (part 3) depicting a calculation example of a proportional distribution calculation for a sales budget;

FIG. 15 is an explanatory diagram depicting a calculation example of a proportional distribution calculation for a gross profit budget;

FIG. 16 is an explanatory diagram depicting a calculation example of a proportional distribution calculation for a purchase budget;

FIG. 17 is an explanatory diagram depicting a calculation example of a proportional distribution calculation for a stock budget;

FIG. 20 is an explanatory diagram (part 1) depicting a screen example of a brand fine-attribute-wise budget-registration screen 2000;

DESCRIPTION OF THE INVENTION

Embodiments of a budget-management-data creating method, a budget-management-data creating apparatus, and a recording medium according to the present invention will be described in detail with reference to the accompanying drawings.

Figure 1:
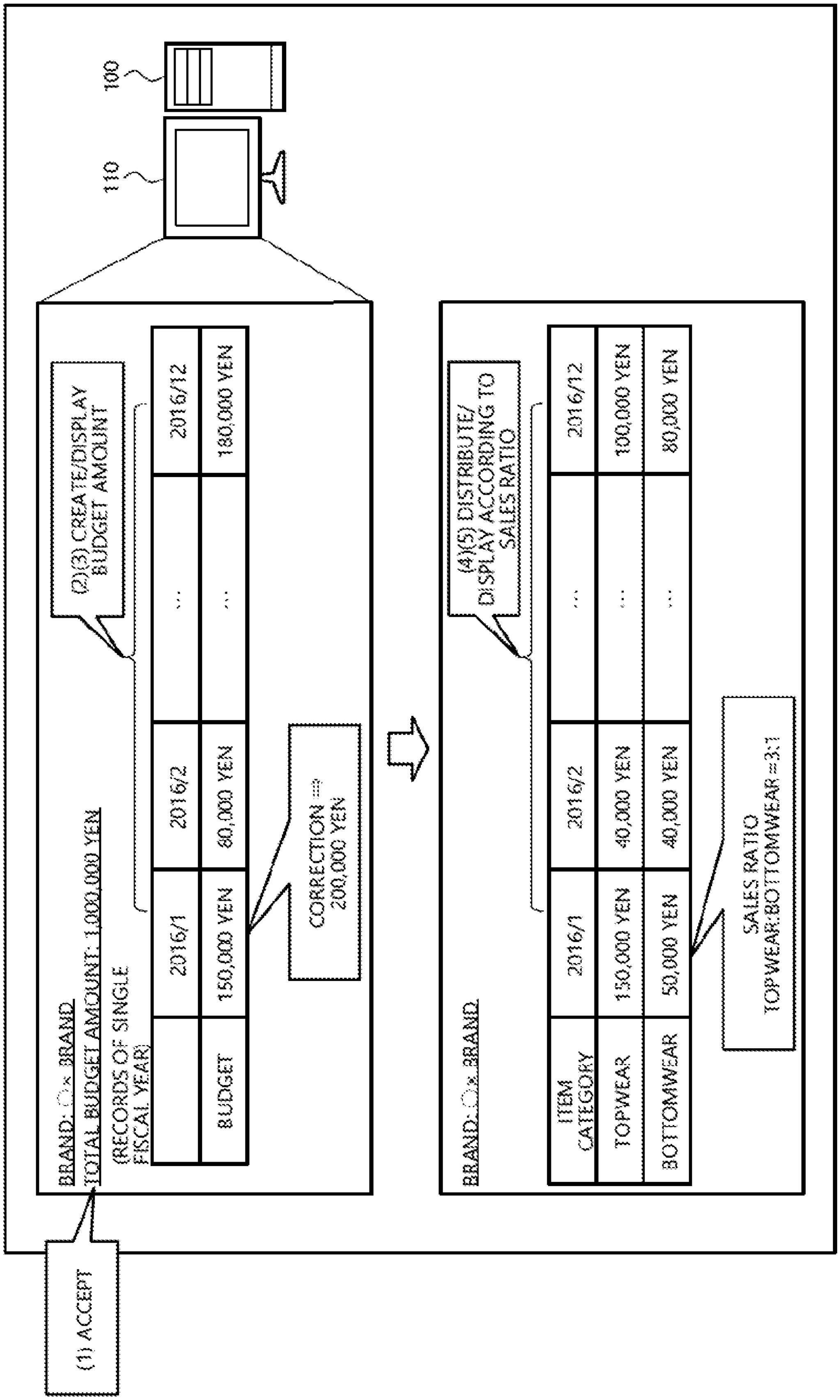
FIG. 1 is an explanatory diagram depicting an example of a budget-management-data creating method according to an embodiment.

FIG. 1 is an explanatory diagram depicting an example of a budget-management-data creating method according to an embodiment. In FIG. 1, a budget-management-data creating apparatus 100 is a computer that creates budget management data. The budget management data is information indicating a budget for each of partial periods of a fiscal year for each item category. The item category is a classification for classifying items.

The item category is specified, for example, by an item attribute characterizing an item. Details of the item attribute are described later with reference to FIG. 6. As the budget, for example, there are sales budget, gross profit budget, purchase budget, stock budget, and the like. The partial period is, for example, day, week, or month.

In companies, it is important to develop a budget plan as to what, by when, and to what extent the plan is achieved, based on a mid- and long-term business plan. For example, when an annual budget plan is developed, it is conceivable to create weekly or monthly budget planning for each item category while referring to past sales records and the like.

However, it takes time and labor to create weekly or monthly budgets for each item category manually, while taking past sales records and the like into consideration. Further, for a person who has less knowledge and experience, it is difficult to judge how to decide the weekly or monthly budget for each item category based on past sales records and the like, thereby causing an increase in workloads and prolongation of the work period required for developing the budget plan.

Therefore, in the present embodiment, a budget-management-data creating method that simplifies creation of budget management data for each item category is described. A process example of the budget-management-data creating apparatus 100 is described below.

(1) The budget-management-data creating apparatus 100 accepts designation of a brand for which budget management data is to be created and designation of a total budget amount. The brand in this example refers to the brand of an item. The total budget amount is a total of the budget for a predetermined period for which the budget management data is to be created. The predetermined period may be arbitrarily set.

In the example of FIG. 1, a case is assumed where the designation of a brand “ox brand” and the designation of a total budget amount of “1,000,000 Yen” are accepted. As the predetermined period, a case is assumed where a period from January to December 2016 is set.

(2) The budget-management-data creating apparatus 100 creates a budget amount for each partial period, which is a result of automatic allocation of the total budget amount to respective partial periods in a predetermined period, based on past sales performance data of a designated brand. Past sales performance data is information based on past sales records related to the brand, and for example, includes sales records in the past, gross profit records, purchase records, and stock records.

In the example of FIG. 1, a case is assumed where the respective partial periods in the predetermined period are “respective months in 2016”, and monthly budgets are created by allocating the total budget amount of “1,000,000 Yen” to the respective months of 2016. Specifically, for example, the budget-management-data creating apparatus 100 creates the monthly budgets by proportionally distributing the total budget amount of “1,000,000 Yen” according to a sales ratio of the respective months in 2015 of the designated brand. The sales ratio of the respective months in 2015 is a ratio among result values of the sales figures (sales records) of the respective months in 2015.

(3) The budget-management-data creating apparatus 100 displays a budget amount corresponding to each of the created partial periods in such a manner to enable a correction instruction to be accepted. In the example of FIG. 1, the budgets corresponding to the respective months in 2016 are displayed in such a manner that a correction instruction may be accepted. For example, “150,000 Yen” is displayed as the budget amount for January 2016, and “80,000 Yen” is displayed as the budget amount for February 2016.

A display 110 may be included in the budget-management-data creating apparatus 100, or may be included in another computer (for example, a client apparatus 201 depicted in FIG. 2 described later) connected communicably with the budget-management-data creating apparatus 100.

(4) Upon acceptance of the correction of the budget for any of the respective partial periods, the budget-management-data creating apparatus 100 proportionally distributes the budget amount corresponding to the respective partial periods reflecting the correction, according to the sales ratio of each item category corresponding to the brand. The sales ratio of respective item categories referred to herein is a ratio among result values of sales figures (sales records) of the respective item categories, in the partial periods in the past corresponding to the respective partial periods in a predetermined period.

A case is assumed where the budget for January 2016 is corrected from “150,000 Yen” to “200,000 Yen”. It is also assumed that the partial period in the past corresponding to January 2016 is January 2015, which is the same month of the previous year. It is also assumed that item categories corresponding to the brand “ox brand” are “topwear” and “bottomwear”, and the sales ratio of the respective item categories in January 2015 is “topwear:bottomwear=3:1”.

In this case, the budget-management-data creating apparatus 100 proportionally distributes the corrected budget of “200,000 Yen” for January 2016 according to the sales ratio of respective item categories “topwear:bottomwear=3:1”. Accordingly, the budget of “150,000 Yen” for the item category “topwear” for January 2016 and the budget of “50,000 Yen” for the item category “bottomwear” for January 2016 are created.

The sales ratio of the respective item categories in February 2015 is assumed to be "topwear:bottomwear=1:1". However, the budget for February 2016 has not been corrected. In this case, the budget-management-data creating apparatus 100 proportionally distributes the budget of "80,000 Yen" for February 2016 according to the sales ratio "topwear:bottomwear=1:1" of the respective item categories. Accordingly, the budget of "40,000 Yen" for the item category "topwear" for February 2016 and the budget of "40,000 Yen" for the item category "bottomwear" for February 2016 are created.

(5) The budget-management-data creating apparatus 100 displays the distribution result obtained by proportionally distributing the budget amount corresponding to the respective partial periods as the budget amount for each item category for the respective partial periods. In the example of FIG. 1, the budget amount for each item category for the respective months in 2016 is displayed on the display 110. For example, "150,000 Yen" is displayed as the budget for January 2016 for the item category "topwear", and "50,000 Yen" is displayed as the budget for January 2016 for the item category "bottomwear".

Upon acceptance of a storage instruction of the budget amount for each item category for the respective partial periods in a predetermined period, the budget-management-data creating apparatus 100 records therein the budget management data indicating the displayed budget amount for each item category for the displayed respective partial periods.

In this manner, according to the budget-management-data creating apparatus 100, it is possible to support creation of budget management data indicating the budget for respective item categories for each partial period in a predetermined period for a designated brand. For example, the budget for the respective item categories for each partial period in the predetermined period is automatically created. Therefore, even a person who has less knowledge and experience of budget planning can create the budget management data easily. Further, because the degree of dependence on the knowledge and experience of the person decreases, dependence on individual skills of the work involved with development of the budget plan may be prevented.

Next, the budget-management-data creating apparatus 100 depicted in FIG. 1 is described for a case where, as an example, the budget-management-data creating apparatus 100 is applied to a business support system 200.

Figure 2:
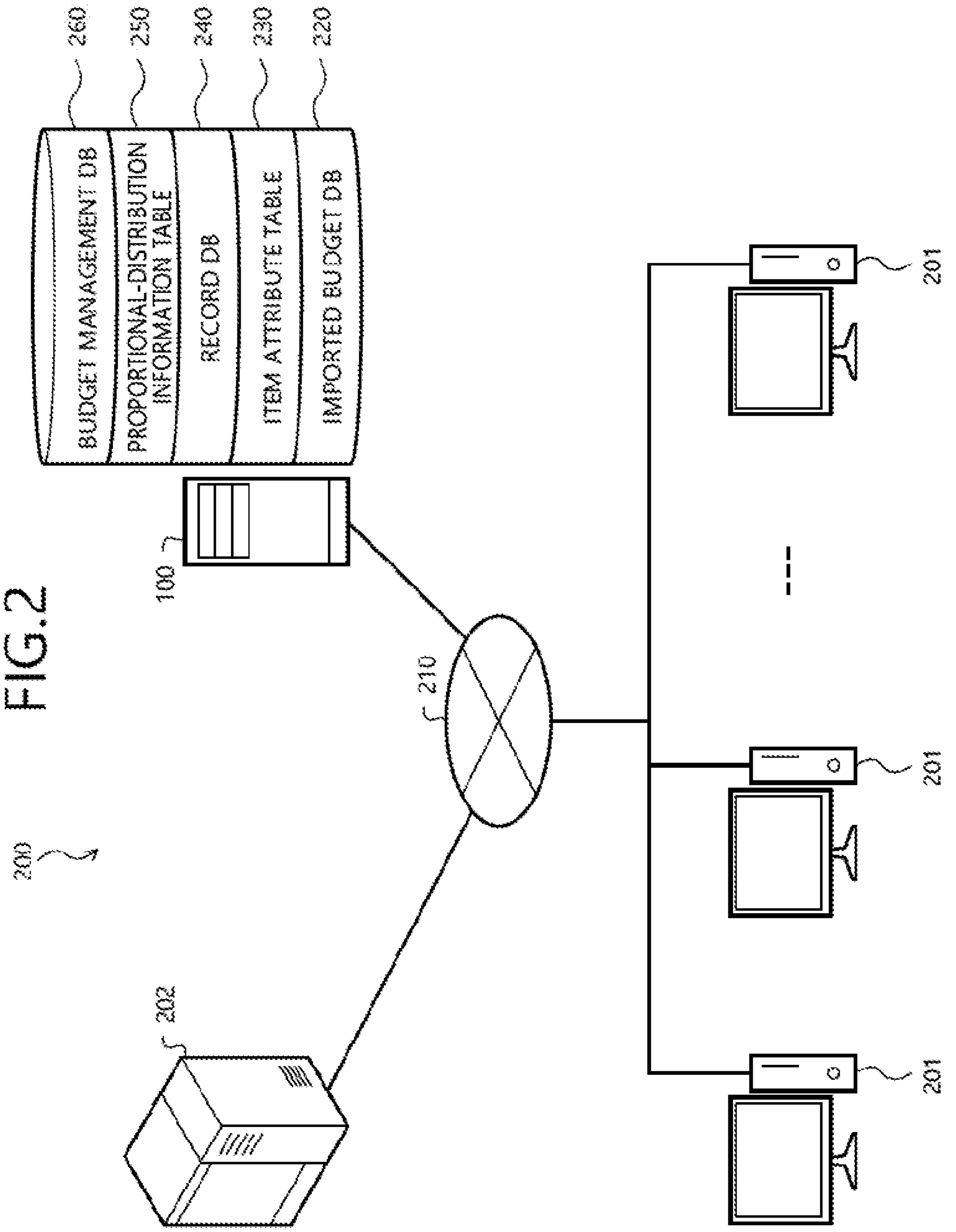
FIG. 2 is an explanatory diagram depicting a system configuration example of a business support system 200.

FIG. 2 is an explanatory diagram depicting a system configuration example of the business support system 200. In FIG. 2, the business support system 200 includes the budget-management-data creating apparatus 100, a plurality of client apparatuses 201, and an order management system 202. In the business support system 200, the budget-management-data creating apparatus 100, the plurality of client apparatuses 201, and the order management system 202 are connected to each other via a wired or wireless network 210. The network 210 is, for example, a local area network (LAN), a wide area network (WAN), or the Internet.

The budget-management-data creating apparatus 100 is a computer including a imported budget DB (database) 220, an item attribute table 230, a record DB 240, a proportional-distribution information table 250, and a budget management DB 260, and creating budget management data. The budget-management-data creating apparatus 100 is a server, for example. Storage contents of the various DBs 220, 230, 240, 250, and 260 are described later with reference to FIG. 5 to FIG. 9.

The client apparatus 201 is a computer to be used by a user of the business support system 200. The client apparatus 201 is a computer such as a personal computer (PC), a tablet terminal, or a smartphone.

The order management system 202 is a computer system that evaluates the total order amount based on a budget (for example, a purchase budget) notified from the budget-management-data creating apparatus 100. For example, upon notification of a purchase budget of "10,000 Yen", the order management system 202 determines whether the actual order placed has exceeded the purchase budget of "10,000 Yen". If the actual order placed has exceeded the purchase budget of "10,000 Yen", the order management system 202 outputs an alarm.

In the business support system 200, for example, upon reception of a request for displaying various screens from the client apparatus 201, the budget-management-data creating apparatus 100 creates screen information of various screens and transmits the created screen information to the client apparatus 201. Due to this operation, the budget-management-data creating apparatus 100 can cause the client apparatus 201 to display various screens (for example, a weekly-budget registration screen 1000 depicted in FIG. 10 described later).

Figure 3:
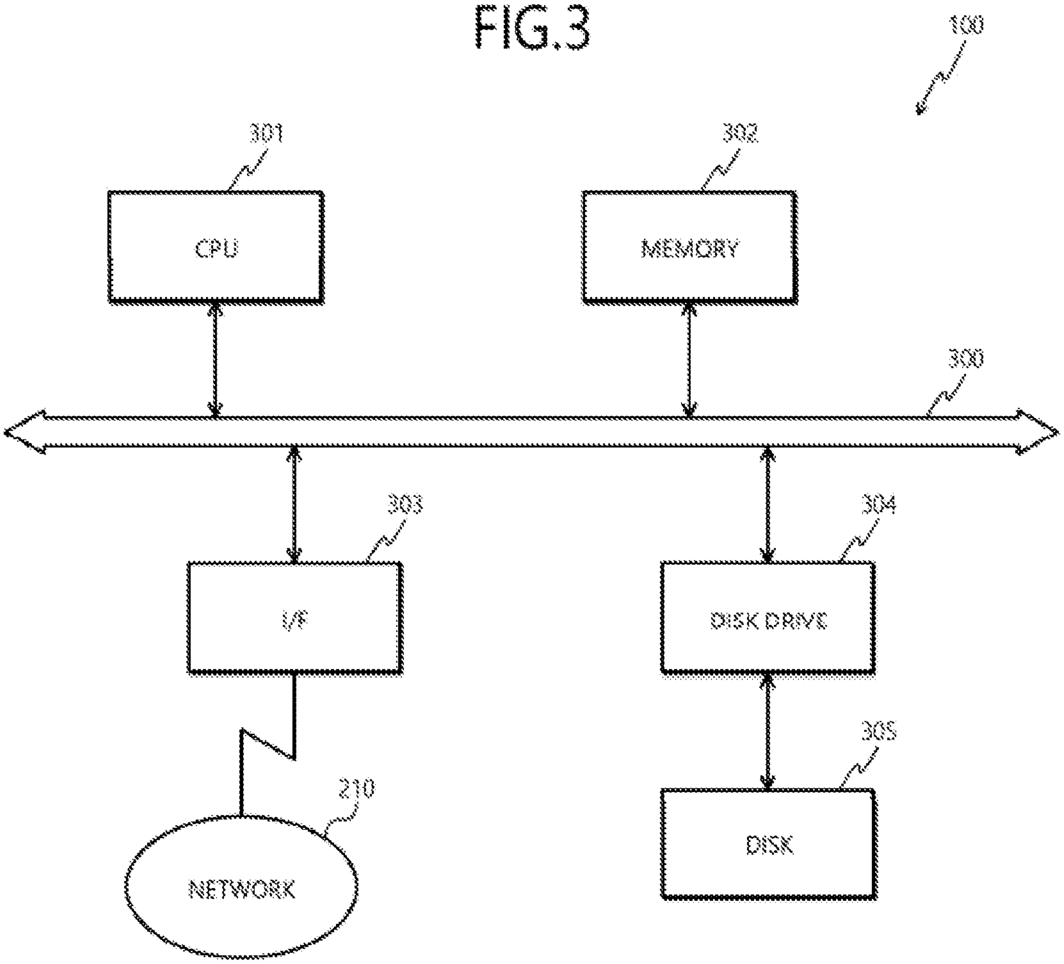
FIG. 3 is a block diagram of hardware configuration of a budget-management-data creating apparatus 100.

FIG. 3 is a block diagram of hardware configuration of the budget-management-data creating apparatus 100. In FIG. 3, the budget-management-data creating apparatus 100 has a central processing unit (CPU 301), the memory 302, an interface (I/F) 303, the disk drive 304, and the disk 305, respectively connected by a bus 300.

Here, the CPU 301 governs overall control of the budget-management-data creating apparatus 100. The memory 302, for example, includes a read-only memory (ROM), a random access memory (RAM), and a flash ROM. In particular, for example, the flash ROM and the ROM store therein various types of programs, and the RAM is used as a work area of the CPU 301. A program stored in the memory 302 is loaded onto the CPU 301, whereby a coded process is executed by the CPU 301.

The I/F 303 is connected to the network 210 through a communications line and is connected to other apparatuses (e.g., the client apparatuses 201 and the order management system 202 depicted in FIG. 2) via the network 210. The I/F 303 administers an internal interface with the network 210, and controls the input and output of data from other apparatuses. The I/F 303, for example, may be a modem, a LAN adapter, etc.

The disk drive 304, under the control of the CPU 301, controls the reading and writing of information with respect to the disk 305. The disk 305 stores data written thereto under the control of the disk drive 304. The disk 305, for example, may be a magnetic disk, an optical disk, etc.

In addition to the configuration above, the budget-management-data creating apparatus 100 may include, for example, a solid state drive, a keyboard, a mouse, a display, etc.

Figure 4:
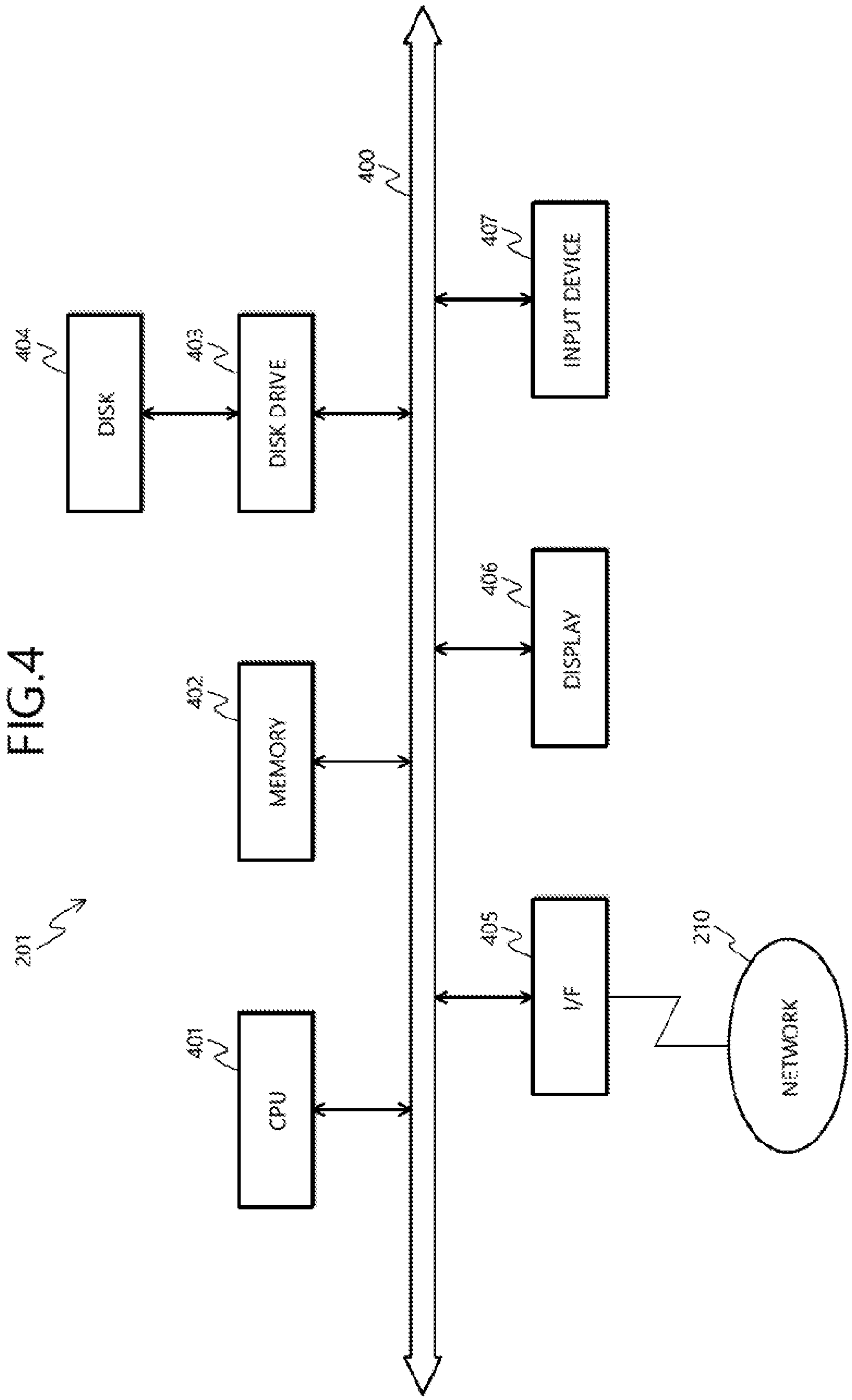
FIG. 4 is a block diagram of hardware configuration of a client apparatus 201.

FIG. 4 is a block diagram of hardware configuration of a client apparatus 201. In FIG. 4, the client apparatus 201 has a CPU 401, a memory 402, a disk drive 403, a disk 404, an I/F 405, a display 406, and an input device 407, respectively connected by a bus 400.

Here, the CPU 401 governs overall control of the client apparatus 201. The memory 402, for example, includes a ROM, a RAM, and a flash ROM. In particular, for example, the flash ROM and the ROM store therein various types of programs, and the RAM is used as a work area of the CPU 401. A program stored in the memory 402 is loaded on the CPU 401, whereby a coded program is executed by the CPU 401.

The disk drive 403, under the control of the CPU 401, controls the reading and writing of data with respect to the disk 404. The disk 404 stores data written thereto under the control of the disk drive 403. The disk 404 is, for example, a magnetic disk, an optical disk, etc.

The I/F 405 is connected to the network 210 through a communications line and is connected to other apparatuses (e.g., the budget-management-data creating apparatus 100 depicted in FIG. 2) via the network 210. The I/F 405 administers an internal interface with the network 210, and controls the input and output of data from other apparatuses.

The display 406 displays data such as documents, images, and functional information, in addition to a cursor, icons, and toolboxes. The display 406, for example, may be a liquid crystal display, a cathode ray tube (CRT), etc.

The input device 407 has keys for inputting characters, numerals, various instructions, etc. and performs data input. The input device 407 may be a keyboard or a mouse, or a touch panel input pad or a numeric pad. The client apparatus 201, for example, may omit the disk drive 403, the disk 404.

Storage contents of the various DBs 220, 230, 240, 250, and 260 included in the budget-management-data creating apparatus 100 are described next. The various DBs 220, 230, 240, 250, and 260 and the like are realized, for example, by a storage apparatus such as the memory 302 and the disk 305 depicted in FIG. 3.

Figure 5:
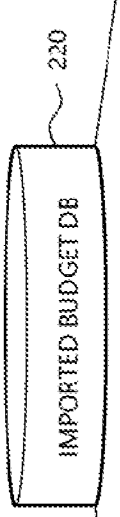
FIG. 5 is an explanatory diagram depicting an example of storage contents of an imported budget DB 220.

FIG. 5 is an explanatory diagram depicting an example of storage contents of the imported budget DB 220. In FIG. 5, the imported budget DB 220 includes fields of brand, sales, gross profit, gross profit margin, purchase, sales-purchase ratio, and initial stock. By setting information in the respective fields, imported annual-budget information (for example, imported annual-budget information 500-1) is stored as a record.

In this case, the brand is a name of an item brand. The sales indicate a sales budget (unit: Yen) for the fiscal year of the entire brand, and corresponds to the sales figures as a target. The fiscal year indicates a year for which budget management data is to be created. The gross profit indicates a gross profit budget (unit: Yen) for the fiscal year of the entire brand, and corresponds to the gross profit as a target.

The gross profit margin indicates a ratio of the gross profit budget to the sales budget for the fiscal year (unit: %). The purchase is a purchase budget (unit: Yen) for the fiscal year of the entire brand, and corresponds to a purchase amount required for achieving the target. The sales-purchase ratio indicates a ratio of the purchase budget to the sales budget for the fiscal year (unit: %). The initial stock is an initial stock budget (unit: Yen).

For example, the imported annual-budget information 500-1 indicates sales of "2,000,000", gross profit of "800, 000", gross profit margin of "40.00", purchase of "2,200, 000", sales-purchase ratio of "110.0", and initial stock of "0" of a brand "A-brand".

For example, the budget-management-data creating apparatus 100 imports a budget file in which the sales, the gross profit, the gross profit margin, the purchase, the sales-purchase ratio, and the initial stock of the respective brands are written, thereby storing the imported annual-budget information in the imported budget DB 220.

Figure 6:
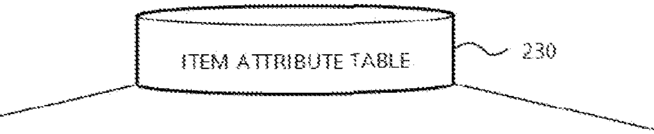
FIG. 6 is an explanatory diagram depicting an example of storage contents of an item attribute table 230.

FIG. 6 is an explanatory diagram depicting an example of storage contents of the item attribute table 230. In FIG. 6, the item attribute table 230 includes fields of brand, year/season, target gender, category, and product number. By setting information in the respective fields, item attribute information (for example, item attribute information 600-1 to 600-4) is stored therein as a record.

In this example, the brand is a name of the item brand. The year/season is a season name indicating which year and which season a certain item is targeted for. For example, as the year/season, there are 2016SS (Spring/Summer) and 2016AW (Autumn/Winter).

The target gender is a gender targeted for a certain item. For example, the target gender includes women's (targeting women) and men's (targeting men). The category is a classification for classifying the type of items. As the category, for example, there are "topwear", "bottomwear", "dress", "shoes", and "miscellaneous goods". The product number is an identifier for identify items. An item name is indicated as the product number.

Each of the brand, the year/season, the target gender, the category, and the product number are one of item attributes for characterizing items. For example, items designated by an item attribute "A-Brand" are all items belonging to a brand name "A-Brand". For example, items designated by an item attribute "A-Brand 2016SS" are all items belonging to the year/season "2016SS" of the brand name "A-Brand".

Figure 7:
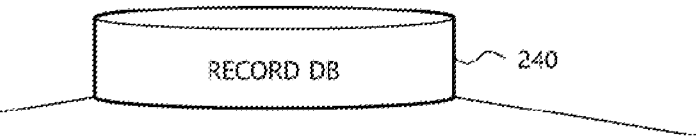
FIG. 7 is an explanatory diagram depicting an example of storage contents of a record DB 240.

FIG. 7 is an explanatory diagram depicting an example of storage contents of the record DB 240. In FIG. 7, the record DB 240 stores therein record information (for example, record information 700-1) indicating the weekly sales record, the gross profit record, the purchase record, and the stock record of the respective past years for each item attribute.

The sales record indicates weekly sales records of the respective past years (unit: Yen). The gross profit record indicates weekly gross profit records of the respective past years (unit: Yen). The purchase record indicates the weekly purchase records of the respective past years (unit: Yen). The stock record indicates the weekly stock records of the respective past years (unit: Yen).

For example, the record information 700-1 indicates weekly sales records, gross profit records, purchase records, and stock records of the respective past years for an item with the item attribute "A-Brand". The record DB 240 can store therein, for example, daily and monthly sales records, gross profit records, purchase records, and stock records of the respective past years.

FIG. 8 is an explanatory diagram depicting an example of storage contents of the proportional-distribution information table 250. In FIG. 8, the proportional-distribution information table 250 stores therein proportional distribution information (for example, proportional distribution information 800-1) indicating results of proportional distribution for weekly sales, gross profit, purchase, and stock for the fiscal year for each item attribute.

The sales indicate a result of proportional distribution (unit: Yen) of weekly sales budgets for the fiscal year, calculated based on past sales records. The respective budgets include an initial budget and a corrected budget. The initial budget corresponds to the result of proportional distribution and the corrected budget corresponds to the corrected budget of the initial budget. The fiscal year is a year for which budget management data is to be created.

The gross profit indicates a result of proportional distribution (unit: Yen) of weekly gross profit budgets for the fiscal year, calculated based on the gross profit records in the past. The purchase indicates a result of proportional distribution (unit: Yen) of weekly purchase budgets for the fiscal year, calculated based on the past purchase records. The stock indicates a result of proportional distribution (unit:

Yen) of weekly stock budgets for the fiscal year, calculated based on the past stock records.

For example, the proportional distribution information 800-1 indicates results of proportional distribution of the weekly sales, gross profit, purchase, and stock in the year 2016, which is the fiscal year of an item designated by the item attribute "A-Brand".

Figure 9:
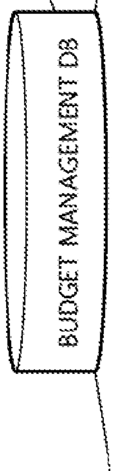
FIG. 9 is an explanatory diagram depicting an example of storage contents of a budget management DB 260.

FIG. 9 is an explanatory diagram depicting an example of storage contents of the budget management DB 260. In FIG. 9, the budget management DB 260 stores therein budget management data (for example, budget management data 900-1) indicating weekly budgets for the sales, gross profit, purchase, and stock for the fiscal year for each item attribute.

The sales indicate weekly sales budgets for the fiscal year (unit: Yen). The gross profit indicates weekly gross profit budgets for the fiscal year (unit: Yen). The purchase indicates weekly purchase budgets for the fiscal year (unit: Yen). The stock indicates weekly stock budgets for the fiscal year (unit: Yen). The respective budget management data includes an order flag.

The order flag is information indicating whether a budget amount has been notified to the order management system 202. When the order flag is "1", it indicates that the budget amount has been notified to the order management system 202. When the order flag is "0", it indicates that the budget amount has not yet been notified to the order management system 202.

For example, the budget management data 900-1 indicates the weekly budgets for the sales, gross profit, purchase, and stock for the fiscal year of the item designated by the item attribute "A-Brand". Because the order flag is "0", it indicates that the budget amounts for the item designated by the item attribute "A-Brand" have not yet been notified to the order management system 202.

Next, a screen example of a weekly-budget registration screen 1000 displayed on the display 406 of the client apparatus 201 is described. In the following descriptions, as an operation in which a user selects a box, a button, and the like displayed on various screens of the display 406, a case where a click operation using the input device 407 depicted in FIG. 4 is performed will be taken as an example.

Figure 10:
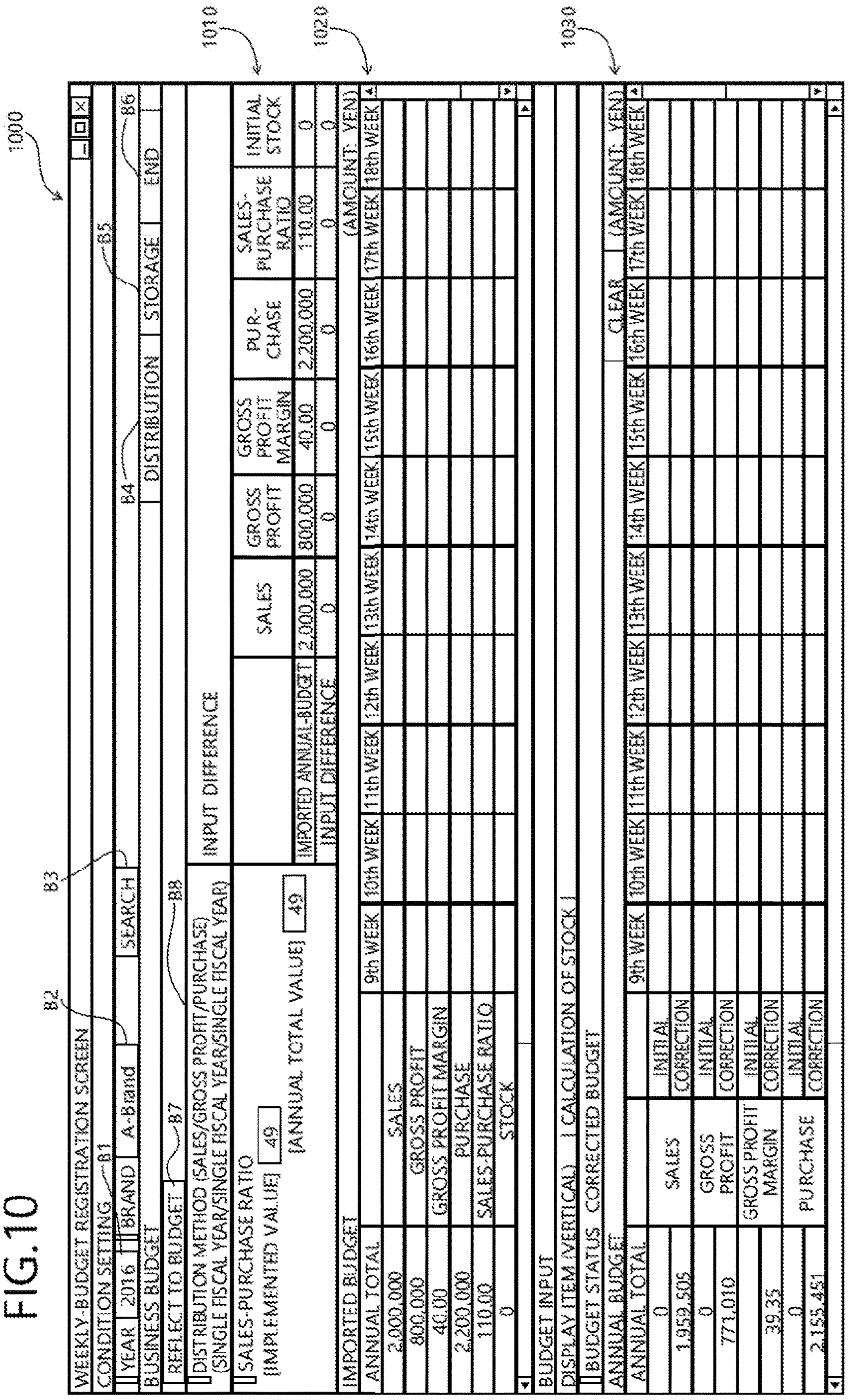
FIG. 10 is an explanatory diagram (part 1) depicting a screen example of a weekly-budget registration screen 1000.

FIG. 10 is an explanatory diagram (part 1) depicting a screen example of the weekly-budget registration screen 1000. In FIG. 10, the weekly-budget registration screen 1000 is an operation screen for registering weekly budgets (for example, the sales budgets, gross profit budgets, purchase budgets, and stock budgets) for the fiscal year with regard to a brand for which budget management data is to be created.

In the weekly-budget registration screen 1000, when a box B1 is clicked, a fiscal year may be designated. The fiscal year is a year for which budget management data is to be created. On the weekly-budget registration screen 1000, when a box B2 is clicked, a brand for which the budget management data is to be created may be designated.

Further, on the weekly-budget registration screen 1000, when a search button B3 is clicked, search conditions including the fiscal year and the information of the brand designated in the boxes B1 and B2 are transmitted from the client apparatus 201 to the budget-management-data creating apparatus 100. In the example depicted in FIG. 10, search conditions including the fiscal year "2016" and the information of the brand "A-Brand" are transmitted.

As a result, the sales budget, gross profit budget, gross profit margin, purchase budget, sales-purchase ratio, and initial stock for the fiscal year of the brand designated in the box B2 are displayed in an imported annual-budget region 1010 on the weekly-budget registration screen 1000. In the example depicted in FIG. 10, a sales budget of "2,000,000", a gross profit budget of "800,000", a gross profit margin of "40.00", a purchase budget of "2,200,000", a sales-purchase ratio of "110.00", and an initial stock of "0" for the year 2016 are displayed.

On the weekly-budget registration screen 1000, when a proportional distribution button B4 is clicked, results of proportional distribution of the weekly sales budget, gross profit budget, purchase budget, and stock budget for the fiscal year are displayed in an imported budget region 1020 on the weekly-budget registration screen 1000. A display example of the imported budget region 1020 is described later with reference to FIG. 18.

On the weekly-budget registration screen 1000, when a box B8 is clicked, a proportional distribution method may be selected for the sales budget, gross profit budget, and purchase budget. In the example depicted in FIG. 10, "single fiscal year (a proportional distribution method based on the records of a single fiscal year) is selected as the proportional distribution method for the sales budget, gross profit budget, and purchase budget. The information of the selected proportional distribution method is transmitted from the client apparatus 201 to the budget-management-data creating apparatus 100.

In the example depicted in FIG. 10, an operation screen for registering weekly budgets for the fiscal year has been described as an example. However, for example, it may be changed to an operation screen for registering monthly or daily budgets for the fiscal year.

Figures 11, 12:
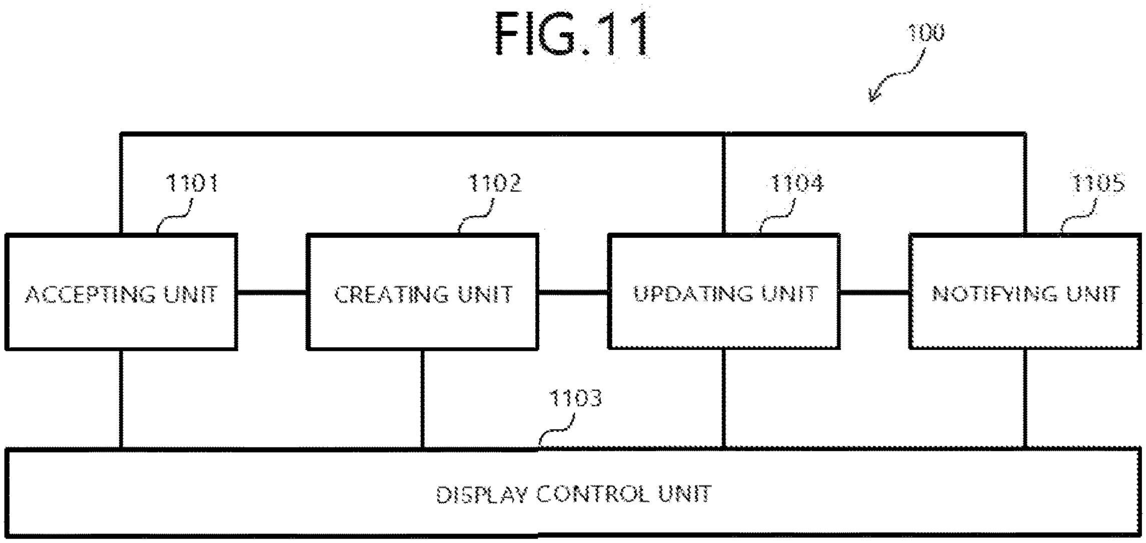
FIG. 11 is a block diagram depicting a functional configuration example of the budget-management-data creating apparatus 100.
FIG. 12 is an explanatory diagram (part 1) depicting a calculation example of a proportional distribution calculation for a sales budget.

FIG. 11 is a block diagram depicting a functional configuration example of the budget-management-data creating apparatus 100. In FIG. 11, the budget-management-data creating apparatus 100 is configured to include an accepting unit 1101, a creating unit 1102, a display control unit 1103, an updating unit 1104, and a notifying unit 1105. Each of the accepting unit 1101, the creating unit 1102, the display control unit 1103, the updating unit 1104, and the notifying unit 1105 are function forming a control unit. Specifically, for example, the functions are realized by causing the CPU 301 to execute a program stored in a storage apparatus such as the memory 302 or the disk 305 depicted in FIG. 3, or realized by the I/F 303. Processing results of respective functional units are stored in a storage apparatus such as the memory 302 or the disk 305.

The accepting unit 1101 accepts designation of the item attribute for which budget management data is to be created and designation of the total budget amount. In this example, the budget management data is information indicating the budgets for respective partial periods of the fiscal year, concerning the item having the designated item attribute. As the budget, for example, there are the sales budget, gross profit budget, purchase budget, and stock budget. The partial period is, for example, day, week, or month.

The total budget amount is an annual budget for a designated item attribute, and is for example the sales budget, gross profit budget, purchase budget, and the like for the fiscal year. For example, when the "brand" is designated as the item attribute, the total budget amount becomes the sales budget, gross profit budget, and purchase budget for the fiscal year of the designated brand overall. Further, when the "brand" and the "year/season" are designated as the item attribute, the total budget amount becomes the sales budget, gross profit budget, and purchase budget for the fiscal year for the item of the designated brand and the designated year/season.

In the following descriptions, as an example, a case is described where the "brand" is designated as an item attribute for which budget management data is to be created.

Designation of the brand is performed on the weekly-budget registration screen 1000 depicted in FIG. 10, for example. Specifically, for example, the accepting unit 1101 accepts search conditions including the designated fiscal year and the brand information, thereby accepting the designation of the brand.

In the example depicted in FIG. 10, the accepting unit 1101 accepts the designation of the brand "A-Brand". In this case, the accepting unit 1101 acquires the imported annual-budget information 500-1 corresponding to the brand "A-Brand", for example, from the imported budget DB 220 (see FIG. 5). Due to this configuration, the respective budgets (sales budget, gross profit budget, and purchase budget) indicated by the imported annual-budget information 500-1 may be accepted as the total budget amount of the respective budgets for the items of the brand "A-Brand".

Note that, with regard to the designation of the total budget amount, for example, configuration may be such that the total budget amount is designated on the weekly-budget registration screen 1000 depicted in FIG. 10. In this case, the accepting unit 1101 accepts the designation of the brand and the designation of the total budget amount by receiving search conditions including the designated fiscal year, brand, and total budget amount from the client apparatus 201.

The creating unit 1102 creates budgets for the respective partial periods being a result of automatically allocating the designated total budget amount to the respective partial periods in a predetermined period, based on past sales performance data of the designated brand. The predetermined period may be set arbitrarily, and is a part or whole period of the fiscal year, for example.

That is, the creating unit 1102 creates a budget amount for each partial period (for example, weekly or monthly) by proportionally distributing a designated total budget amount based on past sales records with regard to a designated brand. Here, the creating unit 1102 may create a budget amount for each of the sales budget, gross profit budget, purchase budget, and stock budget for each partial period in the fiscal year, for example.

As the proportional distribution method, for example, there are a proportional distribution method based on a single year record, a proportional distribution method based on multiple-year records, a proportional distribution method based on a median of the past three years, and a proportional distribution method using a link ratio method, and the like. Specifically, for example, the creating unit 1102 creates weekly budgets by proportionally distributing the designated total budget amount based on past sales records, according to the proportional distribution method selected on the weekly-budget registration screen 1000 depicted in FIG. 10.

A calculation example of a proportional distribution calculation for the sales budget is described later with reference to FIGS. 12 to 14. A calculation example of the proportional distribution calculation for the gross profit budget is described later with reference to FIG. 15. A calculation example of the proportional distribution calculation for the purchase budget is described later with reference to FIG. 16. A calculation example of the proportional distribution calculation for the stock budget is described later with reference to FIG. 17.

With regard to the designated brand (item attribute), created budget amounts (for example, weekly sales budgets, gross profit budgets, purchase budgets, and stock budgets for the fiscal year) for each of partial periods in a predetermined period are stored in, for example, the proportional-distribution information table 250.

Figure 19:
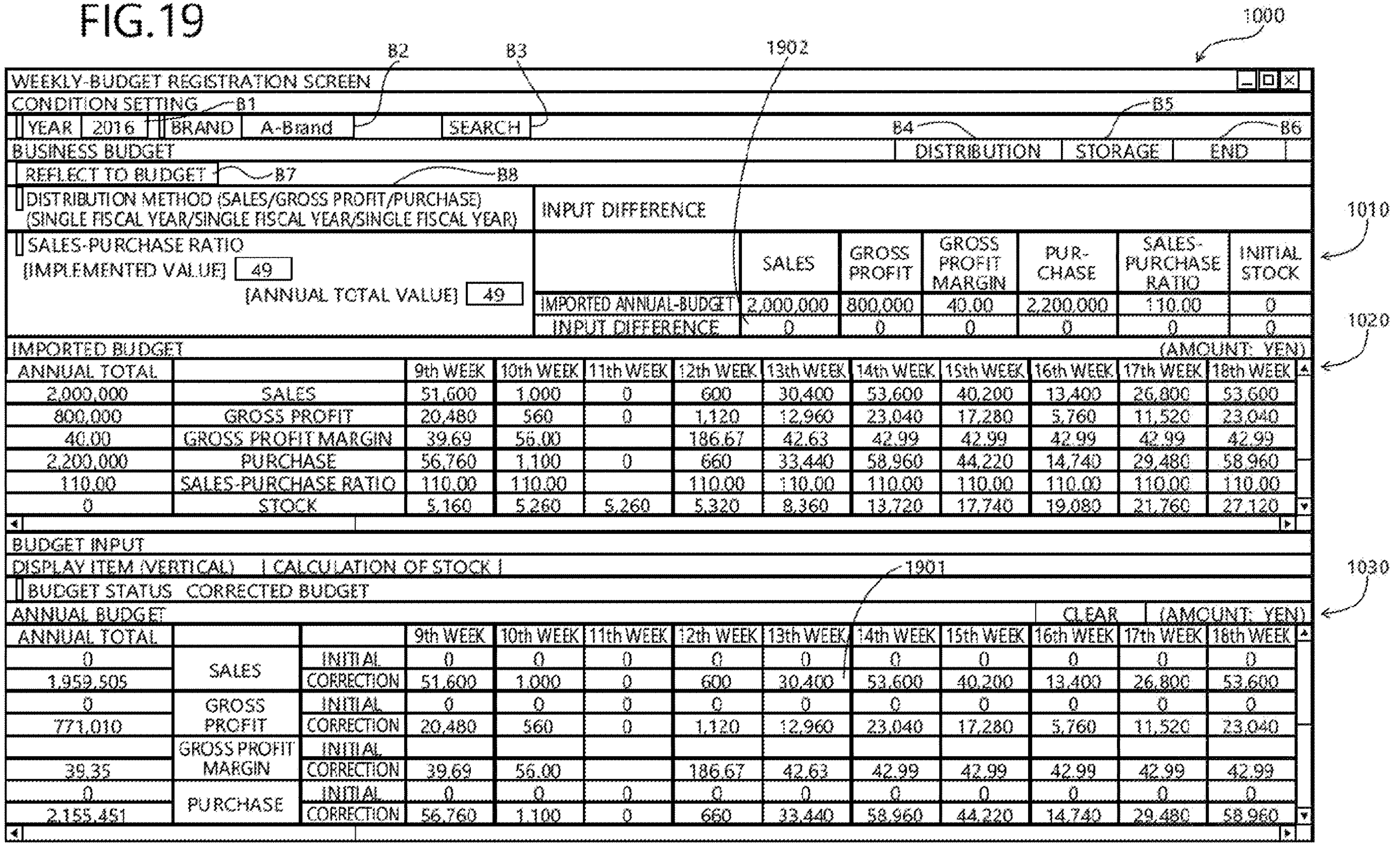
FIG. 19 is an explanatory diagram (part 3) depicting a screen example of the weekly-budget registration screen 1000.

The display control unit 1103 executes control of displaying the created budget amounts corresponding to the respective partial periods in such a manner that a correction instruction may be accepted. Specifically, for example, as depicted in FIG. 19 described later, the display control unit 1103 refers to the proportional-distribution information table 250 to display proportional distribution results of respective weekly budgets for the fiscal year in an annual-budget region 1030 of the weekly-budget registration screen 1000 in such a manner that a correction instruction may be accepted.

The accepting unit 1101 accepts a correction instruction of the budget amount for any of respective partial periods in a predetermined period. The correction instruction of the budget amount includes, for example, a period to be corrected of a designated brand, the budgets (for example, the sales budget, gross profit budget, purchase budget, and stock budget), and information for specifying the corrected budget amount.

The correction instruction of the budget amount is made, for example, on the weekly-budget registration screen 1000 depicted in FIG. 19 described later. Specifically, for example, the accepting unit 1101 accepts the correction instruction of the concerned budget amount by receiving the correction instruction of the budget amount from the client apparatus 201.

The updating unit 1104 corrects the budget amount of the designated brand for the partial period to be corrected according to the correction instruction of the budget amount. Specifically, for example, the updating unit 1104 registers the corrected budget amount as the corrected budget for the week to be corrected of the designated brand (item attribute) in the proportional-distribution information table 250.

The accepting unit 1101 also accepts a storage instruction of the budget amounts for respective partial periods in a predetermined period. The storage instruction of the budget amount is made, for example, on the weekly-budget registration screen 1000 depicted in FIG. 19 described later. Specifically, for example, the accepting unit 1101 accepts the storage instruction for the concerned budget amount by receiving the storage instruction for the budget amount from the client apparatus 201.

The updating unit 1104 stores the budget amounts of the designated brand for the respective partial periods in the predetermined period according to the storage instruction of the budget amount. Specifically, for example, the updating unit 1104 stores to the budget management DB 260, the weekly budgets (for example, the sales budgets, gross profit budgets, purchase budgets, and stock budgets) of the designated brand (item attribute) in the proportional-distribution information table 250.

Here, with regard to a week for which a corrected budget has been registered in the proportional-distribution information table 250, the updating unit 1104 stores the corrected budget to the budget management DB 260 as the budget for the week. Due to this configuration, the budget management data indicating the weekly budgets of the designated brand for the fiscal year may be created. When the budget for any week in the fiscal year has been corrected, the budget management data indicating the corrected budget amount as the budget for the week may be created.

The creating unit 1102 creates budget amounts for respective item categories by proportionally distributing created budget amounts for respective partial periods based on past sales records for each of the item categories registered associated with the designated brand. Specifically, for example, the creating unit 1102 creates the budget amounts for the respective item categories by proportionally distributing the budget amounts for the respective partial periods according to a sales ratio of the respective item categories in the corresponding partial periods in the past.

The item categories corresponding to the designated brand are specified from, for example, the item attribute table 230 depicted in FIG. 6. For example, the item categories corresponding to the brand "A-Brand" include "A-Brand 2016SS", "A-Brand 2016SS Women's", "A-Brand 2016SS Women's topwear" "A-Brand 2016SS Women's topwear T-shirt" and the like.

As an example, a case is described where the sales budget for each of item categories is created by proportionally distributing the sales budget of the brand "A-Brand" for the first week of the year 2016.

In this case, first, the creating unit 1102 refers to, for example, the record DB 240 to specify the sales record of the brand "A-Brand" for the first week of the year 2015, which is the partial period in the past corresponding to the first week of the year 2016. The creating unit 1102 also specifies the sales record of the brand "A-Brand" for each item category in the first week of the year 2015 by referring to the record DB 240. Configuration may be such that the creating unit 1102 specifies the sales record in the first week of or before the year 2014.

Next, the creating unit 1102 calculates a composition ratio (corresponding to a sales ratio) of the respective item categories in the first week of the year 2015 based on the sales records for each of the specified item categories. The composition ratio of the respective item categories indicates a ratio of the sales records of the respective item categories with respect to the sales records (for example, the sales records in the first week of the year 2015) in the partial periods in the past of a designated brand.

The creating unit 1102 then creates the sales budget for each of the item categories in the first week of the year 2016 by proportionally distributing the sales budget for the first week of the year 2016 according to the calculated composition ratio for each of the item categories. The sales budget for the first week of the year 2016 is specified from, for example, the budget management DB 260. Therefore, if the sales budget for the first week of the year 2016 has been corrected, the sales budget for each of the item categories is created based on the corrected sales budget.

With regard to the gross profit budget, purchase budget, and stock budget, by performing proportional distribution in the same manner as for the sales budget, the gross profit budgets, purchase budgets, and stock budgets for each of the item categories may be created. The created budget amounts of the designated brand for each of the item categories for the respective partial periods in a predetermined period (for example, the weekly sales budgets, gross profit budgets, purchase budgets, and stock budgets and the like for each of the item categories for the fiscal year) are stored in, for example, the proportional-distribution information table 250.

The display control unit 1103 executes control of displaying the created budget amounts for each of the item categories for the respective partial periods in a predetermined period. Specifically, for example, the display control unit 1103 executes control of displaying the budget amounts of a certain item category of the created budget amounts for the respective item categories and a list of item categories corresponding to the designated brand, in response to a display instruction of the budget amounts of the certain item category. For example, the item categories corresponding to the designated brand are specified from, for example, the item attribute table 230 as described above.

More specifically, for example, the display control unit 1103 displays a brand fine-attribute-wise budget-registration screen 2000 as depicted in FIG. 20 described later on the client apparatus 201, by referring to the item attribute table 230 and the proportional-distribution information table 250. With regard to a display instruction of the budget amounts of a certain item category, for example, the display instruction may be made on the brand fine-attribute-wise budget-registration screen 2000.

Further, the accepting unit 1101 accepts the correction instruction of the budget amount for each of the item categories for any of the respective partial periods in a predetermined period. The correction instruction of the budget amount for each of the item categories includes, for example, the period to be corrected of the designated brand, the budget (for example, the sales budget, gross profit budget, purchase budget, and stock budget), and information specifying the item category and the corrected budget amount.

Figure 21:
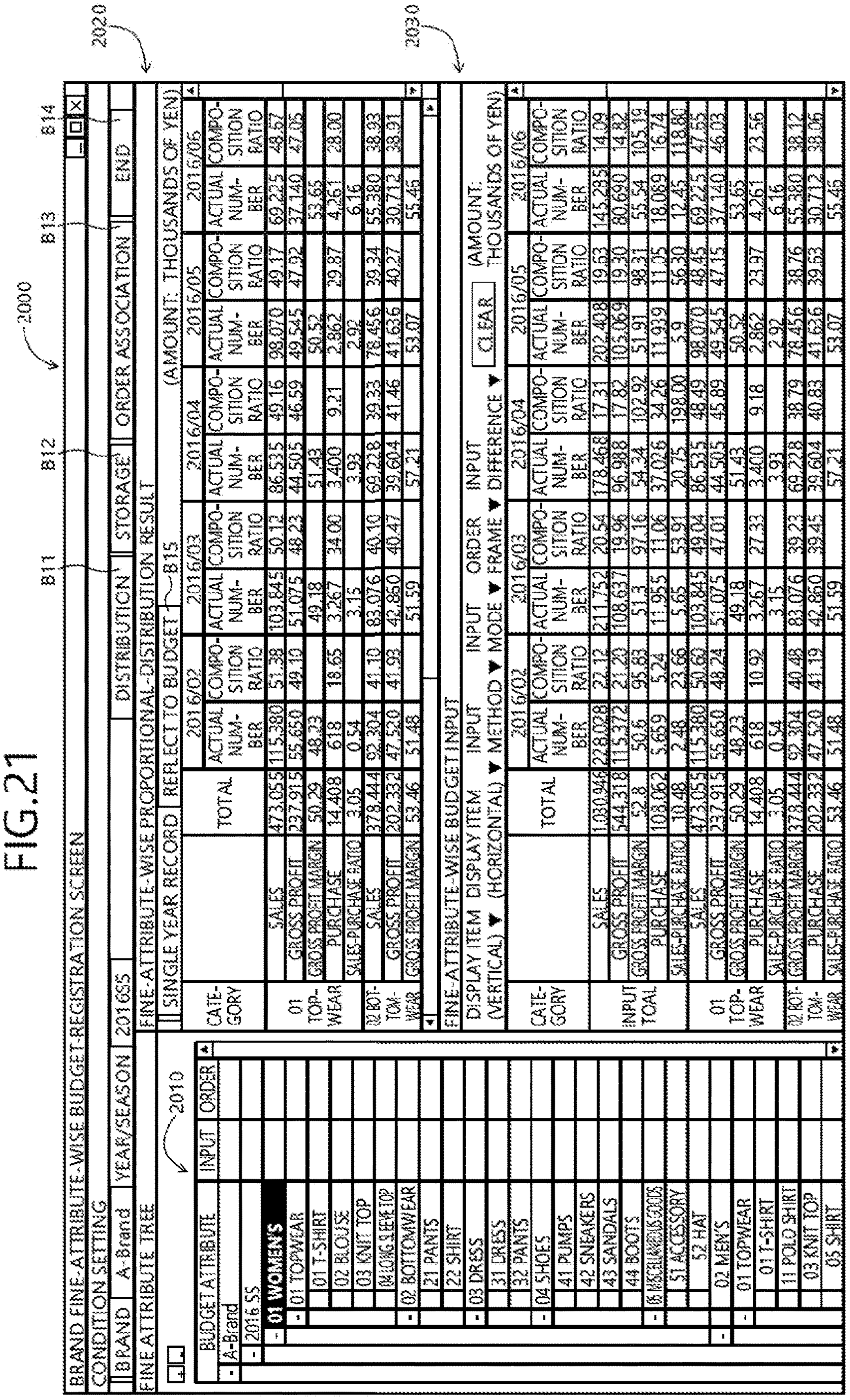
FIG. 21 is an explanatory diagram (part 2) depicting a screen example of the brand fine-attribute-wise budget-registration screen 2000.

The correction instruction of the budget amount for each of the item categories is made, for example, on the brand fine-attribute-wise budget-registration screen 2000 as depicted in FIG. 21 described later. Specifically, for example, the accepting unit 1101 accepts a correction instruction of the budget amount for each of the item categories in question by receiving the correction instruction of the budget amount for each of the item categories from the client apparatus 201.

The updating unit 1104 corrects the budget amount for each of the item categories for a partial period to be corrected of a designated brand, in response to the correction instruction of the budget amount for each of the item categories. Specifically, for example, the updating unit 1104 registers the corrected budget amount as a corrected budget for the week to be corrected of the item category in the proportional-distribution information table 250.

The accepting unit 1101 also accepts a storage instruction of the budget amount for each of the item categories for the respective partial periods in a predetermined period. The storage instruction of the budget amount of each of the item categories is made on the brand fine-attribute-wise budget-registration screen 2000 as depicted in FIG. 21 described later. Specifically, for example, the accepting unit 1101 accepts a storage instruction of the budget amount for each of the item categories by receiving the storage instruction of the budget amount for each concerned item category from the client apparatus 201.

The updating unit 1104 stores the budget amount of a designated brand for each of the item categories for the respective partial periods in a predetermined period, in response to the storage instruction of the budget amount for each of the item categories. Specifically, for example, the updating unit 1104 stores to the budget management DB 260, the weekly budgets (for example, the sales budget, gross profit budget, purchase budget, and stock budget) for each of the item categories of the designated brand (item attribute) in the proportional-distribution information table 250.

Here, with regard to the week for which the corrected budget has been registered in the proportional-distribution information table 250, the updating unit 1104 stores the corrected budget in the budget management DB 260 as the budget for the week. Due to this configuration, the budget management data indicating the weekly budgets of the designated brand for each of the item categories for the fiscal year may be created. Further, when the budget for the item category for any week in the fiscal year has been corrected, the budget management data indicating the corrected budget amount as the budget for the item category for the week may be created.

Upon acceptance of a predetermined operation with or without editing with respect to the budget amount of a certain item category, the display control unit 1103 displays a mark indicating a confirmed input for the budget amount associated with the certain item category, among the item categories included in the list of item categories corresponding to a brand.

Figure 22:
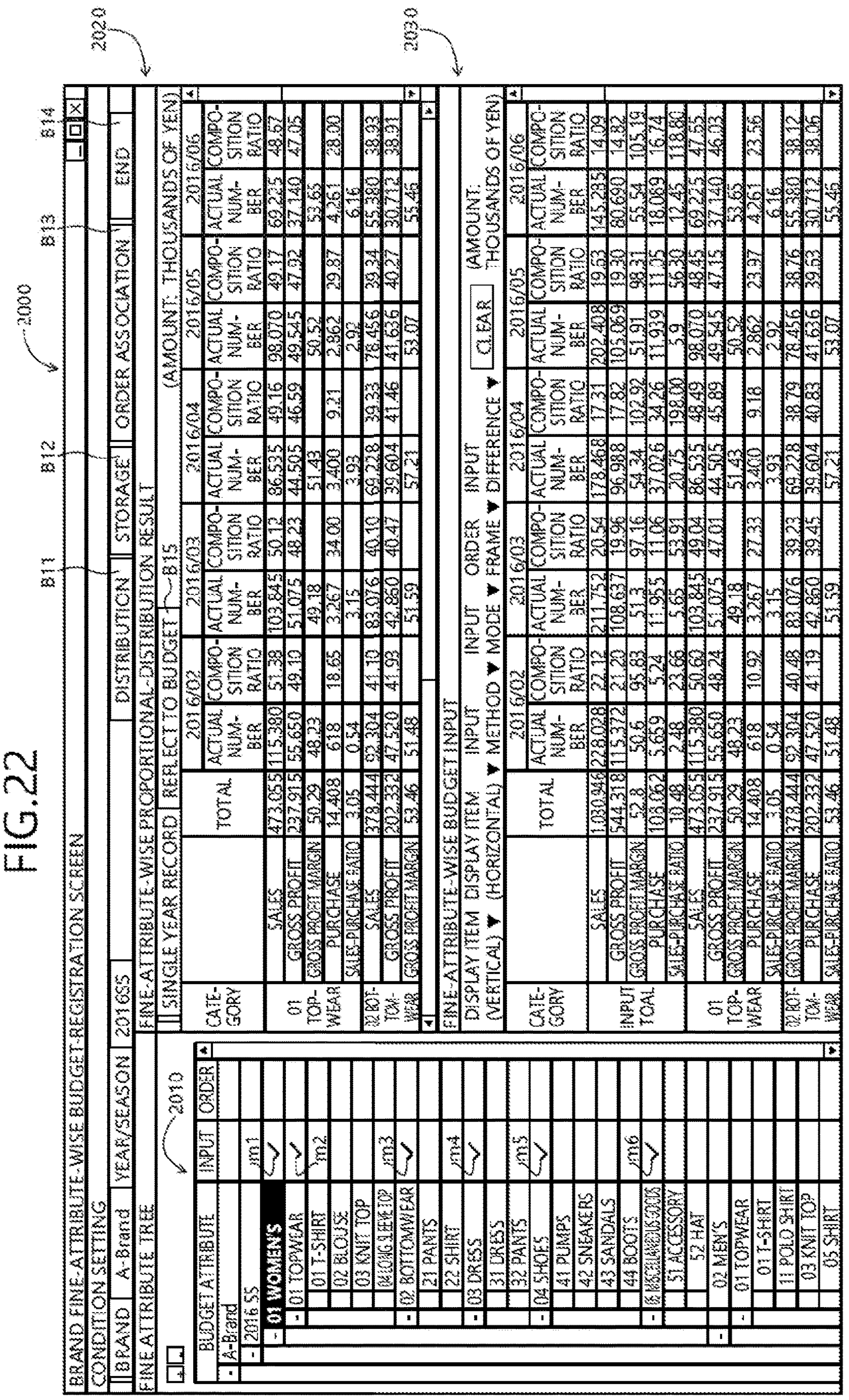
FIG. 22 is an explanatory diagram (part 3) depicting a screen example of the brand fine-attribute-wise budget-registration screen 2000.

Specifically, for example, the display control unit 1103 displays a mark indicating the confirmed input for the budget amount associated with the item category in question on the brand fine-attribute-wise budget-registration screen 2000 as depicted in FIG. 22 described later, in response to the storage instruction of the budget amount for each of the item categories. That is, for an item category for which the weekly budget has been stored in the budget management DB 260, the mark indicating a confirmed input for the budget amount is displayed associated with the item category on the brand fine-attribute-wise budget-registration screen 2000.

The accepting unit 1101 also accepts a notification instruction to the order management system 202 for any of the item categories for which the input has been confirmed. In this case, the notification instruction to the order management system 202 is an instruction to notify the order management system 202 of the purchase budgets, for example, of a certain item category for the respective partial periods in a predetermined period.

The notification instruction to the order management system 202 is made, for example, on the brand fine-attribute-wise budget-registration screen 2000 as depicted in FIG. 22 described later. Specifically, for example, the accepting unit 1101 accepts the notification instruction to the order management system 202 by receiving the notification instruction to the order management system 202 from the client apparatus 201.

The notifying unit 1105 notifies, as for any of the item categories for which the input has been confirmed, the order management system 202 of the budget amount for an item category related to the notification instruction, in response to the acceptance of the notification instruction to the order management system 202. Specifically, for example, the notifying unit 1105 notifies, concerning the item category related to the notification instruction, the order management system 202 of the weekly stock budgets for the fiscal year.

The updating unit 1104 sets "1" to an order flag in the budget management DB 260 in response that the budget amount has been notified to the order management system 202, as for the item category related to the notification instruction. For example, when the budget amount is notified to the order management system 202 for the item category "A-Brand 2016SS Women's", "1" is set to the order flag in the budget management data with respect to the item attribute "A-Brand 2016SS Women's" in the budget management DB 260.

When the budget amount is notified to the order management system 202, the display control unit 1103 displays a mark indicating the notified budget amount associated with the item category related to the notification of the budget amount, among the item categories included in the list of item categories corresponding to a designated brand. Specifically, for example, the display control unit 1103 refers to the budget management DB 260 to display the mark indicating the notified budget amount associated with the item category with the order flag being "1" on the brand fine-attribute-wise budget-registration screen 2000.

Next, calculation examples of proportional distribution calculation for various budgets (the sales budget, gross profit budget, purchase budget, and stock budget) are described with reference to FIG. 12 to FIG. 17.

FIG. 12 is an explanatory diagram (part 1) depicting a calculation example of the proportional distribution calculation for the sales budget. As an example, a case is described where an annual sales budget of "65,500" of the brand "B-Brand" for the year 2016 (the fiscal year) is proportionally distributed to monthly sales budgets for the year 2016 based on the monthly sales records in the year 2015 (single-year records).

First, the creating unit 1102 refers to, for example, the record DB 240 (see FIG. 7) to specify the monthly sales records of the brand "B-Brand" in the year 2015. The creating unit 1102 then calculates a composition ratio indicating a ratio of the monthly sales record in the year 2015 to a sales record "597,000" in the year 2015 respectively based on the specified monthly sales records in the year 2015. For example, the composition ratio of March in the year 2015 becomes "5.36 (≅32,000÷597,000×100)". The creating unit 1102 calculates the total of "100.03" of the monthly composition ratios in the year 2015.

Next, the creating unit 1102 subtracts a fraction of "0.03" from the largest composition ratio of the monthly composition ratios in the year 2015 to perform correction (allocation of the fraction) of the monthly composition ratios. In this case, correction is performed such that the total of the composition ratios becomes "100", by subtracting the fraction of "0.03" from the February composition ratio of "12.73", which is the largest composition ratio.

The creating unit 1102 then proportionally distributes the sales budget of "65,500" for the year 2016 to the monthly sales budgets for the year 2016 based on the corrected monthly composition ratios. For example, the sales budget for March of the year 2016 becomes "3,511 (≅65,500×5.36÷100)". The creating unit 1102 calculates the total of "65,498" of the monthly sales budgets for the year 2016.

Next, the creating unit 1102 adds a difference of "2" to the largest sales budget of the monthly sales budgets for the year 2016 to perform correction (allocation of the difference) of the monthly sales budgets. The difference of "2" is a difference between the annual sales budget of "65,500" for the year 2016 and the total of monthly sales budgets of "65,498". In this case, the creating unit 1102 performs correction such that the total of the monthly sales budgets and the sales budget of "65,500" match each other by adding a difference of "2" to the February sales budget of "8,318", which is the largest sales budget.

Accordingly, the monthly sales budgets for the year 2016 of the brand "B-Brand" may be obtained based on the monthly sales records in the year 2015 of the brand "B-Brand". Note that the calculated monthly sales budgets for the year 2016 of the brand "B-Brand" are stored in, for example, the proportional-distribution information table 250 (see FIG. 8).

FIG. 13 is an explanatory diagram (part 2) depicting a calculation example of the proportional distribution calculation for the sales budget. As an example, a case is described where the annual sales budget of "65,500" of the brand "B-Brand" for the year 2016 (the fiscal year) is proportionally distributed to monthly sales budgets for the year 2016 based on the monthly sales records in the year 2013 to the year 2015.

First, the creating unit 1102 refers to, for example, the record DB 240 to specify the monthly sales records of the brand "B-Brand" in the year 2013 to the year 2015. The creating unit 1102 then calculates a monthly three-year total based on the specified monthly sales records in the year 2013 to the year 2015.

The creating unit 1102 then calculates monthly average sales records in the year 2013 to the year 2015 by dividing the calculated monthly three-year total by 3. At the time of calculating the average sales records, a year in which the sales record is "0" is not included. For example, when the sales record of a certain month in the year 2013 is "0", the average sales record is calculated based on the sales records in the year 2014 and the year 2015.

Next, the creating unit 1102 calculates an average value of "49,667" of the monthly average sales records in the year 2013 to the year 2015. The creating unit 1102 then calculates a seasonal index indicating a ratio of the monthly average sales records to the calculated average value of "49,667". The seasonal index is an index value indicating the degree of deviation from the average. For example, the seasonal index of March becomes "63.09 (≅31,333÷49,667×100)".

The creating unit 1102 calculates a composition ratio indicating a ratio of the monthly seasonal indexes to the total of "1,200.01" of the monthly seasonal indexes. For example, the composition ratio of March becomes "5.26 (≅63.09÷1,200.01×100)". The creating unit 1102 calculates the total of "100.00" of the monthly composition ratios.

Next, the creating unit 1102 performs correction of the monthly composition ratios (allocation of the fraction) by subtracting a fraction from or adding the fraction to the largest composition ratio of the monthly composition ratios. However, because the fraction of the monthly total of "100.00" of the monthly composition ratios is "0", the correction of the monthly composition ratios is not performed.

The creating unit 1102 proportionally distributes the annual sales budget of "65,500" for the year 2016 to monthly sales budgets for the year 2016 based on the monthly composition ratios. For example, the sales budget for March 2016 becomes "3,445 (≅65,500×5.26÷100)". The creating unit 1102 calculates the total of "65,502" of the monthly sales budgets for the year 2016.

Next, the creating unit 1102 subtracts a difference of "2" from the largest sales budget of the monthly sales budgets for the year 2016 to perform correction (allocation of the difference) of the monthly sales budgets. The difference of "2" is a difference between the annual sales budget of "65,500" for the year 2016 and the total of monthly sales budgets of "65,502". The creating unit 1102 performs correction such that that the total of the monthly sales budgets and the sales budget of "65,500" match each other by subtracting the difference of "2" from the February sales budget of "8,319", which is the largest sales budget.

Accordingly, the monthly sales budgets for the year 2016 for the brand "B-Brand" may be obtained based on the monthly sales records in the year 2013 to the year 2015 of the brand "B-Brand". Note that the calculated monthly sales budgets for the year 2016 of the brand "B-Brand" are stored in, for example, the proportional-distribution information table 250 (see FIG. 8).

FIG. 14 is an explanatory diagram (part 3) depicting a calculation example of the proportional distribution calculation for the sales budget. As an example a case is described where the annual sales budget of "65,500" of the brand "B-Brand" for the year 2016 (the fiscal year) is proportionally distributed to monthly sales budgets for the year 2016 based on three-year medians of the monthly sales records in the year 2013 to the year 2015.

First, the creating unit 1102 refers to, for example, the record DB 240 to specify the monthly sales records of the brand "B-Brand" in the year 2013 to the year 2015. The creating unit 1102 then specifies the three-year medians of the monthly sales records based on the specified monthly sales records in the year 2013 to the year 2015.

The creating unit 1102 calculates an average value of "50,167" of the three-year medians of the calculated monthly sales records. The creating unit 1102 then respectively calculates a seasonal index indicating a ratio of the three-year medians of the monthly sales records to the calculated average value of "50,167". For example, the seasonal index of March becomes "63.79 (≅32,000÷50,167×100)".

The creating unit 1102 calculates a composition ratio indicating a ratio of the monthly seasonal indexes to the total of "1,200.01" of the monthly seasonal indexes. For example, the composition ratio of March becomes "5.32 (≅63.79÷1,200.01×100)". The creating unit 1102 calculates the total of "100.01" of the monthly composition ratios.

Next, the creating unit 1102 performs correction of the monthly composition ratios (allocation of the fraction) by subtracting a fraction of "0.01" from the largest composition ratio of the monthly composition ratios. In this case, correction is performed such that the total of the composition ratios becomes "100" by subtracting the fraction of "0.01" from the composition ratio "12.79" of June, which is the largest composition ratio.

The creating unit 1102 then proportionally distributes the annual sales budget of "65,500" for the year 2016 to monthly sales budgets for the year 2016 based on the corrected monthly composition ratios. For example, the sales budget for March 2016 becomes "3,485 (≅65,500×5.32÷100)". The creating unit 1102 then calculates the total of "65,502" of the monthly sales budgets for the year 2016.

Next, the creating unit 1102 subtracts a difference of "2" from the largest sales budget of the monthly sales budgets for the year 2016 to perform correction (allocation of the difference) of the monthly sales budgets. The difference of "2" is a difference between the annual sales budget of "65,500" for the year 2016 and the total of monthly sales budgets of "65,502". The creating unit 1102 performs correction such that the total of the monthly sales budgets and the annual sales budget of "65,500" match each other by subtracting the difference of "2" from the June sales budget of "8,371", which is the largest sales budget.

Accordingly, the monthly sales budgets for the year 2016 of the brand "B-Brand" may be obtained based on the three-year medians of the monthly sales records in the year 2013 to the year 2015 of the brand "B-Brand". Note that the calculated monthly sales budgets for the year 2016 of the brand "B-Brand" are stored in, for example, the proportional-distribution information table 250 (see FIG. 8).

FIG. 15 is an explanatory diagram depicting a calculation example of the proportional distribution calculation for the gross profit budget. As an example, a case is described where the gross profit budget of "360,250" of the brand "B-Brand" for the year 2016 (the fiscal year) is proportionally distributed to monthly sales budgets for the year 2016 based on the monthly sales budgets for the year 2016. It is assumed here that the sales budget for the year 2016 is "655,000" and the gross profit margin is "55.00".

First, the creating unit 1102 specifies the monthly sales budgets for the year 2016 of the brand "B-Brand" by referring to the proportional-distribution information table 250. The creating unit 1102 specifies the monthly sales records and the monthly gross profit records in the year 2015 of the brand "B-Brand" by referring to the record DB 240. The creating unit 1102 then calculates the monthly actual gross profit margins in the year 2015 based on the specified monthly sales records and monthly gross profit records in the year 2015.

The creating unit 1102 calculates the monthly gross profit budgets (provisional) for the year 2016 based on the monthly sales budgets for the year 2016 and the monthly actual gross profit margins in the year 2015. For example, the gross profit budget for March 2016 (provisional) becomes "13,808≅34,519×40.00÷100".

Next, the creating unit 1102 calculates a composition ratio indicating a ratio of the monthly gross profit budgets (provisional) for the year 2016 to the total of "298,098" of the monthly gross profit budgets for the year 2016, based on the calculated monthly gross profit budgets (provisional) for the year 2016. For example, the composition ratio of March 2016 becomes "4.63 (≅13,808÷298,098×100)". The creating unit 1102 calculates the total of "99.99" of the monthly composition ratios for the year 2016.

The creating unit 1102 performs correction of the monthly composition ratios (allocation of the fraction) by adding a fraction of "0.01" to the largest composition ratio of the monthly composition ratios for the year 2016. In this case, correction is performed such that the total of the composition ratios becomes "100" by adding the fraction of "0.01" to the composition ratio "15.24" of January, which is the largest composition ratio.

Next, the creating unit 1102 proportionally distributes the gross profit budget of "360,250" for the year 2016 to monthly gross profit budgets for the year 2016 based on the corrected monthly composition ratios. For example, the gross profit budget for March 2016 becomes "16,680 (≅360, 250×4.63÷100)". The creating unit 1102 then calculates the total of "360,250" of the monthly gross profit budgets for the year 2016.

The creating unit 1102 subtracts a difference between the gross profit budget and the total of the monthly gross profit budgets for the year 2016 from the largest gross profit budget of the monthly gross profit budgets, or adding the difference to the largest gross profit budget to perform correction (allocation of the difference) of the monthly gross profit budgets. Because the difference between the gross profit budget and the total of the monthly gross profit budgets for the year 2016 is "0", the correction of the monthly gross profit budgets is not performed.

The creating unit 1102 also calculates the monthly gross profit margins for the year 2016 based on the monthly sales budgets and the monthly gross profit budgets for the year 2016. For example, the gross profit margin for March 2016 becomes "48 (≅16,680÷34,519×100)".

Accordingly, the monthly gross profit budgets and the monthly gross profit margins for the year 2016 of the brand "B-Brand" may be obtained based on the monthly actual gross profit margins in the year 2015 of the brand "B-Brand". The calculated monthly gross profit budgets and monthly gross profit margins for the year 2016 of the brand "B-Brand" are stored in, for example, the proportional-distribution information table 250 (see FIG. 8).

FIG. 16 is an explanatory diagram depicting a calculation example of the proportional distribution calculation for the purchase budget. As an example, a case is described where the purchase budget of "753,250" of the brand "B-Brand" for the year 2016 (the fiscal year) is proportionally distributed to monthly purchase budgets for the year 2016 based on the monthly sales budgets for the year 2016. It is assumed that the purchase budget for the year 2016 is "753,250" and the sales-purchase ratio is "115.00".

First, the creating unit 1102 specifies the monthly sales budgets for the year 2016 of the brand "B-Brand" by referring to the proportional-distribution information table 250. Next, the creating unit 1102 specifies the monthly sales records and the monthly purchase records in the year 2015 of the brand "B-Brand" by referring to the record DB 240. The creating unit 1102 then calculates the monthly actual sales-purchase ratios in the year 2015 based on the specified monthly sales records and monthly purchase records in the year 2015.

Next, the creating unit 1102 calculates the monthly purchase budgets (provisional) for the year 2016 based on the monthly sales budgets for the year 2016 and the monthly actual sales-purchase ratios in the year 2015. For example, the purchase budget for March 2016 (provisional) becomes "41,423≅34,519×120.00÷100".

The creating unit 1102 then calculates a composition ratio indicating a ratio of the monthly purchase budgets (provisional) for the year 2016 to the total of "727,240" of the monthly purchase budgets (provisional) for the year 2016, based on the calculated monthly purchase budgets (provisional) for the year 2016. For example, the composition ratio of March 2016 becomes "5.70 (≅41,423÷727,240×100)". The creating unit 1102 calculates the total of "100.01" of the monthly composition ratios for the year 2016.

Next, the creating unit 1102 performs correction of the monthly composition ratios (allocation of the fraction) by subtracting a fraction of "0.01" from the largest composition ratio of the monthly composition ratios for the year 2016. In this case, correction is performed such that the total of the composition ratios becomes "100" by subtracting the fraction of "0.01" from the composition ratio of "12.06" of June, which is the largest composition ratio.

The creating unit 1102 then proportionally distributes the purchase budget of "753,250" for the year 2016 to monthly purchase budgets for the year 2016 based on the corrected monthly composition ratios. For example, the purchase budget for March 2016 becomes "42,935 (≅753,250× 5.70÷100)". The creating unit 1102 then calculates the total of "753,249" of the monthly purchase budgets for the year 2016.

Next, the creating unit 1102 adds a difference of "1" between the purchase budget and the total of the monthly purchase budgets to the largest purchase budget of the monthly purchase budgets to perform correction (allocation of the difference) of the monthly purchase budgets. In this case, the creating unit 1102 adds the difference of "1" to the purchase budget of "90,767" for June, which is the largest purchase budget, to perform correction such that the total of the monthly purchase budgets and the purchase budget of "753,250" match each other.

The creating unit 1102 also calculates the monthly sales-purchase ratios for the year 2016 based on the monthly sales budgets and the monthly purchase budgets for the year 2016. For example, the sales-purchase ratio for March 2016 becomes "124 (≅42,935÷34,519×100)".

Accordingly, the monthly purchase budgets and the monthly sales-purchase ratios for the year 2016 of the brand "B-Brand" may be obtained based on the monthly actual sales-purchase ratios in the year 2015 of the brand "B-Brand". The calculated monthly purchase budgets and monthly sales-purchase ratios for the year 2016 of the brand "B-Brand" are stored in, for example, the proportional-distribution information table 250 (see FIG. 8).

FIG. 17 is an explanatory diagram depicting a calculation example of the proportional distribution calculation for the stock budget. As an example, a case is described where the monthly stock budgets (monthly initial stock budgets) of the brand "B-Brand" for the year 2016 are calculated based on the monthly stock records in the year 2015.

The creating unit 1102 first specifies the monthly stock records in the year 2015 of the brand "B-Brand" by referring to the record DB 240. The creating unit 1102 then calculates an average of "49,750" of the specified monthly stock records in the year 2015.

The creating unit 1102 then specifies the monthly sales budgets for the year 2016 of the brand "B-Brand" by referring to the proportional-distribution information table 250. The creating unit 1102 calculates an average of "54, 583" of the specified monthly sales budgets for the year 2016.

Next, the creating unit 1102 calculates monthly seasonal indexes for the year 2016 based on the monthly sales budgets for the year 2016 and the average of "54,583" of the monthly sales budgets for the year 2016. For example, the seasonal index of March 2016 becomes "63.24 (≅34, 519÷54,583×100)".

The creating unit 1102 then calculates monthly "(1+seasonal index)/2" for the year 2016 based on the calculated monthly seasonal indexes for the year 2016. The creating unit 1102 calculates the monthly stock budgets (monthly initial stock budgets) for the year 2016, based on the calculated average of "49,750" of the monthly stock records in the year 2015 and the monthly "(1+seasonal index)/2" for the year 2016. For example, the stock budget for March 2016 becomes "40,606 (≅49,750×81.62÷100)".

Accordingly, the monthly stock budgets for the year 2016 of the brand "B-Brand" may be obtained based on the monthly stock records of the brand "B-Brand" in the year 2015. The calculated monthly stock budgets for the year 2016 of the brand "B-Brand" are stored in, for example, the proportional-distribution information table 250 (see FIG. 8).

An example of screen transition of the weekly-budget registration screen 1000 is described next with reference to FIG. 18 and FIG. 19.

Figure 18:
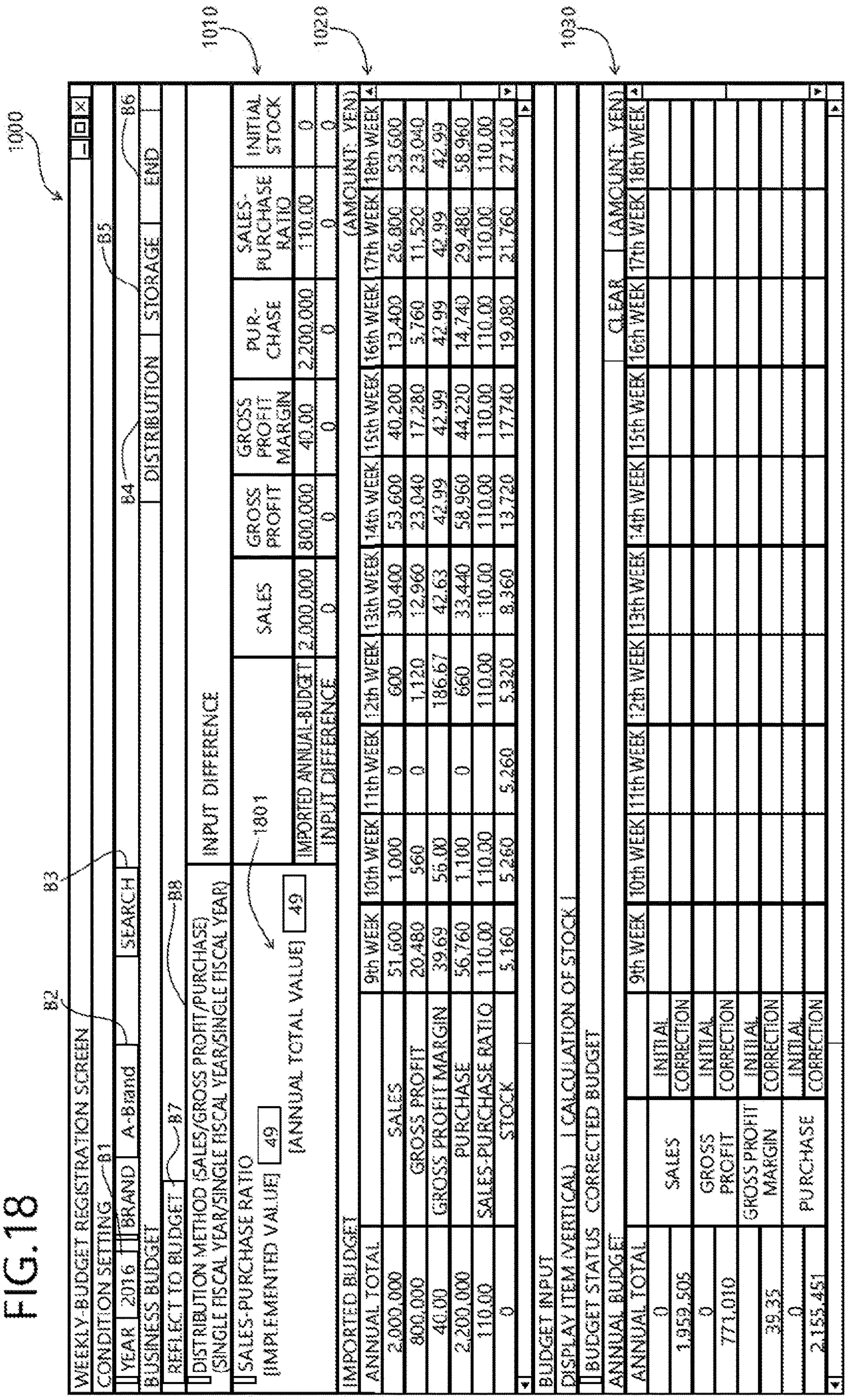
FIG. 18 is an explanatory diagram (part 2) depicting a screen example of the weekly-budget registration screen 1000.

FIG. 18 is an explanatory diagram (part 2) depicting a screen example of the weekly-budget registration screen 1000. In FIG. 18, results of proportional distribution of the sales budget, gross profit budget, purchase budget, and stock budget by week (in the example depicted in FIG. 18, the ninth week to the eighteenth week) for the year 2016 (the fiscal year) are displayed in the imported budget region 1020 on the weekly-budget registration screen 1000. Further, the weekly gross profit margin based on the weekly sales budget and gross profit budget for the year 2016 and the weekly sales-purchase ratio based on the weekly sales budget and purchase budget for the year 2016 are displayed in the imported budget region 1020.

According to the weekly-budget registration screen 1000, a user can confirm the results of proportional distribution of the sales budget, the gross profit budget, purchase budget, and stock budget by week for the year 2016, as well as the weekly gross profit margin and the weekly sales-purchase ratio for the year 2016 based on the results of proportional distribution in question. Information 1801 indicating the selected proportional distribution method is also displayed on the weekly-budget registration screen 1000. Therefore, the user can ascertain based on which criteria the respective budgets for the year 2016 have been proportionally distributed.

On the weekly-budget registration screen 1000, the results of proportional distribution of the weekly sales budgets, gross profit budgets, purchase budgets, and stock budgets for the year 2016 may be displayed in the annual-budget region 1030 as depicted in FIG. 19, by clicking a reflection button B7. By selecting a partial period in the imported budget region 1020, a period for which the results of proportional distribution for the weekly sales budgets, gross profit budgets, purchase budgets, and stock budgets are displayed (for example, a period from the ninth week to the thirteenth week) may be selected.

FIG. 19 is an explanatory diagram (part 3) depicting a screen example of the weekly-budget registration screen 1000. In FIG. 19, the sales budget, gross profit budget, purchase budget, and stock budget by week (in the example depicted in FIG. 19, the ninth week to the eighteenth week) for the year 2016 (the fiscal year) are displayed in the annual-budget region 1030 on the weekly-budget registration screen 1000.

Furthermore, the weekly gross profit margin based on the weekly sales budget and gross profit budget for the year 2016 is also displayed in the annual-budget region 1030. Although not depicted in FIG. 19, the weekly sales-purchase ratio based on the weekly sales budget and purchase budget for the year 2016 is also displayed in the annual-budget region 1030.

On the weekly-budget registration screen 1000, by clicking each box in the annual-budget region 1030, the weekly sales budget, gross profit budget, purchase budget, and stock budget may be corrected. For example, by clicking a box 1901, the sales budget for the thirteenth week may be corrected. When a weekly budget amount is corrected, a correction instruction of the budget amount for the week in question is transmitted from the client apparatus 201 to the budget-management-data creating apparatus 100.

Furthermore, when the weekly sales budget, gross profit budget, purchase budget, and stock budget are corrected, a difference from the initial budget is displayed as an input difference in the imported annual-budget region 1010. For example, when the sales budget for the thirteenth week is corrected from "30,400" to "20,000", a difference of "−10, 400" is displayed as an input difference of the sales budget in a box 1902 in the imported annual-budget region 1010. Due to this configuration, a change amount from the initial budget may be easily judged.

Further, on the weekly-budget registration screen 1000, when a storage button B5 is clicked, a storage instruction of the weekly budget amounts for the year 2016 is transmitted from the client apparatus 201 to the budget-management-data creating apparatus 100. On the weekly-budget registration screen 1000, when an end button B6 is clicked, the display on the weekly-budget registration screen 1000 may be ended.

An example of screen transition of the brand fine-attribute-wise budget-registration screen 2000 displayed on the display 406 of the client apparatus 201 is described next with reference FIG. 20 to FIG. 23.

FIG. 20 is an explanatory diagram (part 1) depicting a screen example of the brand fine-attribute-wise budget-registration screen 2000. In FIG. 20, the brand fine-attribute-wise budget-registration screen 2000 is an operation screen displayed in response to the display instruction of the budget amount of a certain item category.

On the brand fine-attribute-wise budget-registration screen 2000, when any item category in the category list 2010 is designated, a display instruction of the budget amount corresponding to the designated item category is transmitted from the client apparatus 201 to the budget-management-data creating apparatus 100.

For example, by designating an item category "A-Brand 2016SS Women's" and clicking a proportional distribution button B11, a display instruction of the budget amounts of respective item categories (topwear, bottomwear, dress, shoes, and miscellaneous goods) in a hierarchy immediately below the item category in question is transmitted. As a result, the weekly budgets of the respective item categories (topwear, bottomwear, dress, shoes, and miscellaneous goods) are displayed in a fine-attribute-wise proportional-distribution result region 2020 on the brand fine-attribute-wise budget-registration screen 2000.

According to the brand fine-attribute-wise budget-registration screen 2000, a user can confirm the results of proportional distribution of the weekly sales budget, gross profit budget, and purchase budget of the respective item categories for the year 2016. The user can also confirm the weekly gross profit margin and sales-purchase ratio of the respective item categories for the year 2016 based on the results of proportional distribution.

On the brand fine-attribute-wise budget-registration screen 2000, by clicking a reflection button B15, as depicted in FIG. 21, the results of proportional distribution of the weekly sales budget, gross profit budget, and purchase budget of the respective item categories for the year 2016 may be displayed in a fine-attribute-wise budget input region 2030.

FIG. 21 is an explanatory diagram (part 2) depicting a screen example of the brand fine-attribute-wise budget-registration screen 2000. In FIG. 21, in the fine-attribute-wise budget input region 2030 of the brand fine-attribute-wise budget-registration screen 2000, the sales budget, the gross profit budget, and the purchase budget by week (in the example of FIG. 21, the second week to the sixth week) of the respective item categories for the year 2016 (for the fiscal year) are displayed.

Furthermore, in the fine-attribute-wise budget input region 2030, the weekly gross profit margin based on the weekly sales budget and gross profit budget of the respective item categories for the year 2016, and the weekly sales-purchase ratio based on the weekly sales budget and purchase budget of the respective item categories for the year 2016 are displayed.

On the brand fine-attribute-wise budget-registration screen 2000, by clicking each box in the fine-attribute-wise budget input region 2030, the weekly sales budget, gross profit budget, and purchase budget of the respective item categories may be corrected. When any of the weekly budgets of the respective item categories is corrected, the composition ratio is recalculated according to the correction of the budget.

On the brand fine-attribute-wise budget-registration screen 2000, when a storage button B12 is clicked, a storage instruction of the weekly budget amounts of the respective item categories for the year 2016 is transmitted from the client apparatus 201 to the budget-management-data creating apparatus 100. As a result, as depicted in FIG. 22, a mark indicating a confirmed input for the budget amount is displayed, associated with the item category in the category list 2010.

FIG. 22 is an explanatory diagram (part 3) depicting a screen example of the brand fine-attribute-wise budget-registration screen 2000. In FIG. 22, in a category list 2010 on the brand fine-attribute-wise budget-registration screen 2000, marks m1 to m6 indicating a confirmed input for the budget amount are displayed, associated with the item category related to the storage instruction of the budget amounts transmitted to the budget-management-data creating apparatus 100.

According to the brand fine-attribute-wise budget-registration screen 2000, a user can recognize that the budget amounts for the respective item categories (topwear, bottomwear, dress, shoes, and miscellaneous goods) in a hierarchy immediately below the item category "A-Brand 2016SS Women's" have been stored.

On the brand fine-attribute-wise budget-registration screen 2000, when an order association button B13 is clicked, a notification instruction to the order management system 202 with regard to the respective item categories (topwear, bottomwear, dress, shoes, and miscellaneous goods) for which an input has been confirmed related to the budget amount is transmitted from the client apparatus 201 to the budget-management-data creating apparatus 100.

Figure 23:
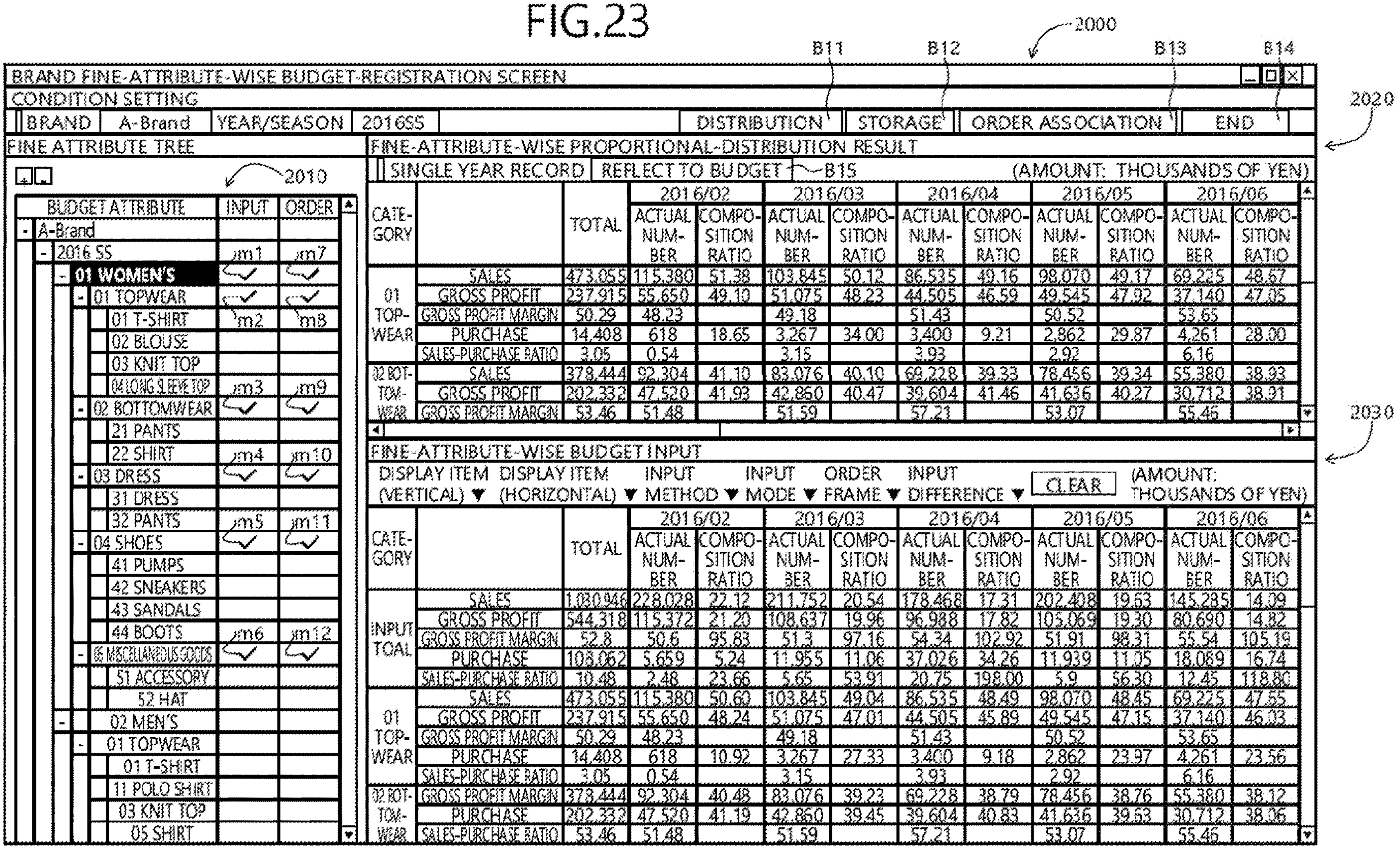
FIG. 23 is an explanatory diagram (part 4) depicting a screen example of the brand fine-attribute-wise budget-registration screen 2000.

As a result, as depicted in FIG. 23, a mark indicating the notified budget amount is displayed, associated with the item category in the category list 2010. The notification instruction to the order management system 202 includes information specifying the weekly purchase budgets of the respective item categories for the year 2016.

FIG. 23 is an explanatory diagram (part 4) depicting a screen example of the brand fine-attribute-wise budget-registration screen 2000. In FIG. 23, marks m7 to m12 indicating the notified budget amount are displayed, associated with the item category related to the notification instruction to the order management system 202, in the category list 2010 on the brand fine-attribute-wise budget-registration screen 2000.

According to the brand fine-attribute-wise budget-registration screen 2000, the user can recognize that the purchase budgets for the respective item categories (topwear, bottomwear, dress, shoes, and miscellaneous goods) in the hierarchy immediately below the item category "A-Brand 2016SS Women's" have been notified.

On the brand fine-attribute-wise budget-registration screen 2000, when an end button B14 is clicked, display of the brand fine-attribute-wise budget-registration screen 2000 may be ended.

A budget-management-data creation process procedure performed by the budget-management-data creating apparatus 100 is described next with reference FIG. 24 and FIG. 25.

Figure 24:
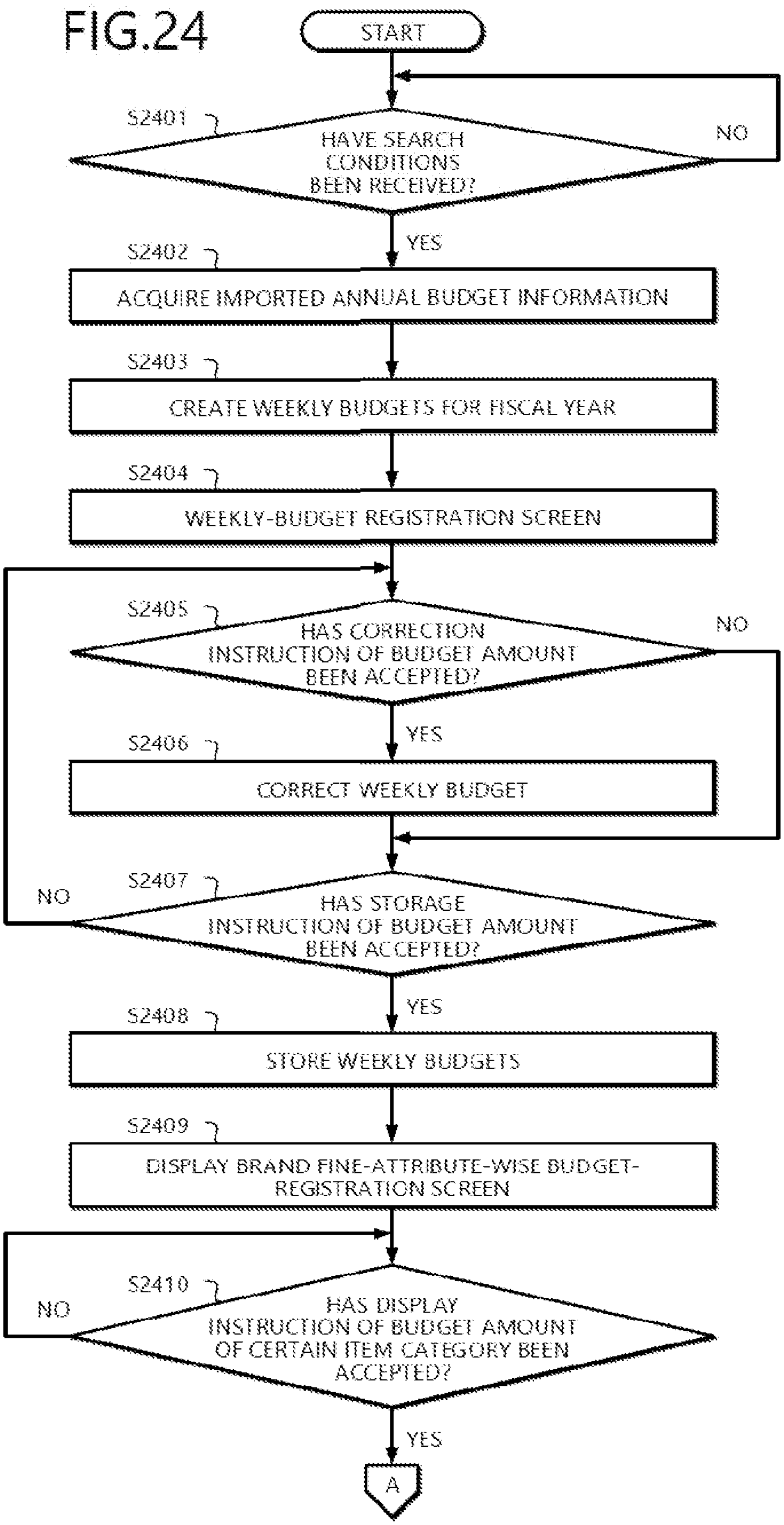
FIG. 24 and FIG. 25 are flowcharts depicting an example of a budget-management-data creation process procedure performed by the budget-management-data creating apparatus 100.
Figure 25:
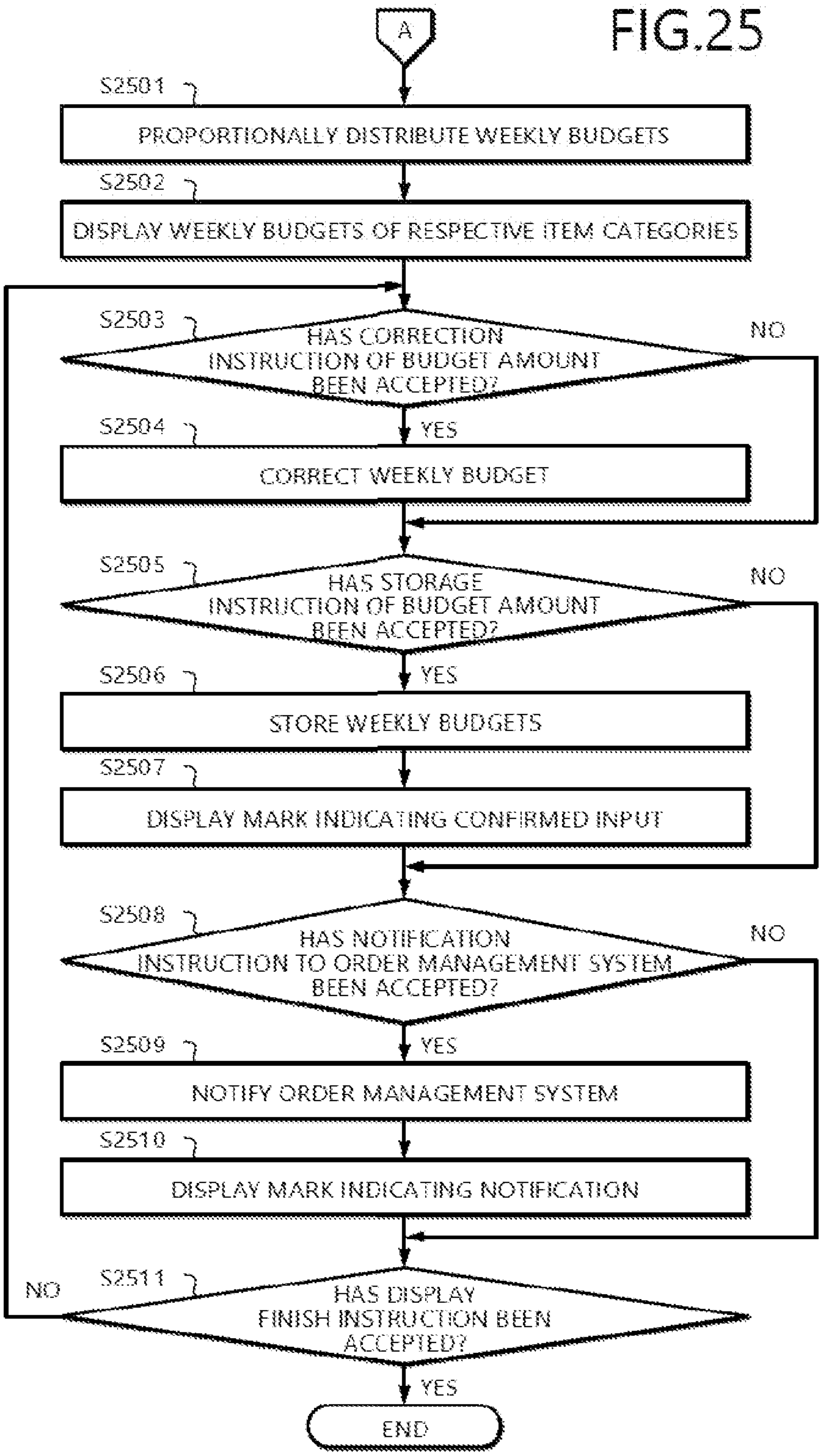

FIG. 24 and FIG. 25 are flowcharts depicting an example of the budget-management-data creation process procedure performed by the budget-management-data creating apparatus 100. In the flowchart in FIG. 24, first, the budget-management-data creating apparatus 100 determines whether search conditions including the designated fiscal year and information of a brand have been received from the client apparatus 201 (step S2401).

The budget-management-data creating apparatus 100 waits for reception of the search conditions (step S2401: NO). Upon reception of the search conditions (step S2401: YES), the budget-management-data creating apparatus 100 acquires the imported annual budget information corresponding to the brand included in the search conditions from the imported budget DB 220 (step S2402).

Next, the budget-management-data creating apparatus 100 creates weekly budgets for the fiscal year (sales budgets, gross profit budgets, purchase budgets, and stock budgets)

with regard to the designated brand by referring to the record DB 240 (step S2403). The budget-management-data creating apparatus 100 displays the weekly-budget registration screen 1000 on the client apparatus 201 (step S2404).

The weekly-budget registration screen 1000 is an operation screen for displaying for the fiscal year, the weekly budgets (the sales budgets, gross profit budgets, purchase budgets, and stock budgets), which are created at step S2403, in such a manner that a correction instruction may be accepted. At step S2403, the budget-management-data creating apparatus 100 can create monthly budgets for the fiscal year with regard to the designated brand.

Next, the budget-management-data creating apparatus 100 determines whether a correction instruction of the budget amount has been accepted for any of the weekly budgets for the fiscal year (step S2405). If a correction instruction of the budget amount has not been accepted (step S2405: NO), the budget-management-data creating apparatus 100 proceeds to step S2407.

On the other hand, if a correction instruction of the budget amount has been accepted (step S2405: YES), the budget-management-data creating apparatus 100 corrects the weekly budget to be corrected of the designated brand (step S2406). The budget-management-data creating apparatus 100 then determines whether a storage instruction of the budget amount has been accepted for the weekly budgets for the fiscal year (step S2407).

If a storage instruction of the budget amount has not been accepted (step S2407: NO), the budget-management-data creating apparatus 100 returns to step S2405. On the other hand, if a storage instruction of the budget amount has been accepted (step S2407: YES), the budget-management-data creating apparatus 100 stores the weekly budgets for the fiscal year in the budget management DB 260 for the designated brand (step S2408).

Next, the budget-management-data creating apparatus 100 displays the brand fine-attribute-wise budget-registration screen 2000 on the client apparatus 201 (step S2409). Note that, at this moment, the respective boxes in the fine-attribute-wise proportional-distribution result region 2020 and the fine-attribute-wise budget input region 2030 on the brand fine-attribute-wise budget-registration screen 2000 are blank. The budget-management-data creating apparatus 100 then determines whether a display instruction of the budget amount of a certain item category has been accepted (step S2410).

The budget-management-data creating apparatus 100 waits for acceptance of the display instruction of the budget amount of the certain item category (step S2410: NO). Upon acceptance of the display instruction of the budget amount of the certain item category (step S2410: YES), the budget-management-data creating apparatus 100 proceeds to step S2501 depicted in FIG. 25.

In the flowchart of FIG. 25, first, the budget-management-data creating apparatus 100 proportionally distributes the weekly budgets for the fiscal year of the designated brand corresponding to the composition ratio of the respective item categories of the certain item category in the corresponding first week of the previous year, by referring to the budget management DB 260 (step S2501). The budget-management-data creating apparatus 100 then displays the results of proportional distribution of the weekly budgets for the fiscal year as the weekly budgets of the respective item categories for the fiscal year (step S2502).

The budget-management-data creating apparatus 100 then determines whether a correction instruction of the budget amount of an item category has been accepted for any of the weekly budgets for the fiscal year (step S2503). If a correction instruction of the budget amount has not been accepted (step S2503: NO), the budget-management-data creating apparatus 100 proceeds to step S2505.

On the other hand, if a correction instruction of the budget amount has been accepted (step S2503: YES), the budget-management-data creating apparatus 100 corrects the weekly budget to be corrected of the item category of the designated brand (step S2504). The budget-management-data creating apparatus 100 then determines whether a storage instruction of the budget amount for each of the item categories has been accepted for the weekly budgets for the fiscal year (step S2505).

If a storage instruction of the budget amount has not been accepted (step S2505: NO), the budget-management-data creating apparatus 100 proceeds to step S2508. On the other hand, if a storage instruction of the budget amount has been accepted (step S2505: YES), the budget-management-data creating apparatus 100 stores the weekly budgets for each of the item categories for the fiscal year of the designated brand to the budget management DB 260 (step S2506).

The budget-management-data creating apparatus 100 then displays a mark indicating a confirmed input for the budget amount, associated with the item category related to the storage instruction of the budget amount in the category list 2010 on the brand fine-attribute-wise budget-registration screen 2000 (step S2507). The budget-management-data creating apparatus 100 then determines whether a notification instruction to the order management system 202 has been accepted for any of the item categories for which the input has been confirmed (step S2508).

If a notification instruction to the order management system 202 has not been accepted (step S2508: NO), the budget-management-data creating apparatus 100 proceeds to step S2511. On the other hand, if a notification instruction to the order management system 202 has been accepted (step S2508: YES), the budget-management-data creating apparatus 100 notifies the order management system 202 of the budget amount for the item category related to the notification instruction (step S2509).

When the budget amount is notified to the order management system 202 for the item category related to the notification instruction, "1" is set in the order flag in the budget management DB 260.

Next, the budget-management-data creating apparatus 100 displays a mark indicating the notified budget amount in the category list 2010 on the brand fine-attribute-wise budget-registration screen 2000, associated with the item category related to the notification of the budget amount, by referring to the budget management DB 260 (step S2510).

The budget-management-data creating apparatus 100 then determines whether a display finish instruction has been accepted (step S2511). If a display finish instruction has not been accepted (step S2511: NO), the budget-management-data creating apparatus 100 returns to step S2503. On the other hand, if a display finish instruction has been accepted (step S2511: YES), the budget-management-data creating apparatus 100 finishes a series of processes according to the flowchart.

Accordingly, the budget management data indicating the weekly (or monthly) budgets for each of the item categories for the fiscal year may be created with regard to the designated brand.

As described above, according to the budget-management-data creating apparatus 100 of the present embodiment, designation of the brand for which the budget management data is to be created and designation of the total budget amount may be accepted. According to the budget-management-data creating apparatus 100, the weekly (or monthly) budgets for the fiscal year, being a result of allocation of the total budget amount to respective weeks (or respective months) for the fiscal year may be created by referring to the record DB 240. Due to this configuration, the weekly (or monthly) budgets for the fiscal year may be automatically created.

According to the budget-management-data creating apparatus 100, the weekly (or monthly) budgets for the fiscal year may be displayed in such a manner that a correction instruction may be accepted. Accordingly, a user can correct the weekly (or monthly) budgets for the fiscal year created by performing period proportional distribution of the designated total budget amount with regard to the designated brand.

According to the budget-management-data creating apparatus 100, when a correction of the budget amount is accepted for any of the weekly (or monthly) budgets for the fiscal year, the weekly budgets reflecting the correction may be proportionally distributed according to a sales ratio (composition ratio) of the respective item categories in the same week in the past. Accordingly, the weekly (or monthly) budgets for each of the item categories for the fiscal year may be created.

According to the budget-management-data creating apparatus 100, the result of proportional distribution obtained by proportionally distributing the weekly (or monthly) budgets for the fiscal year may be displayed as the weekly budgets for the first week. Accordingly, the user can confirm the weekly (or monthly) budget amount for each of the item categories for the fiscal year with regard to the designated brand.

According to the budget-management-data creating apparatus 100, the weekly (or monthly) budget amount for the fiscal year may be created by proportionally distributing the total budget amount to respective weeks (or respective months) of the fiscal year according to the proportional distribution method selected from the proportional distribution methods. According to the budget-management-data creating apparatus 100, at the time of displaying the weekly (or monthly) budgets for the fiscal year, information indicating the selected proportional distribution method may be also displayed. Accordingly, it may be easily ascertained based on which criteria the total budget amount has been proportionally distributed.

According to the budget-management-data creating apparatus 100, the budget for a certain item category of respective budgets for a plurality of item categories and a list of item categories corresponding to the designated brand may be displayed, in response to a display instruction of the budget amount of the certain item category. Further, according to the budget-management-data creating apparatus 100, when a storage instruction is accepted with or without editing with respect to the budget of the certain item category, a mark indicating a confirmed input for the budget amount may be displayed associated with the certain item category in the list of item categories. Accordingly, the user may intuitively determine for which item category of the item categories corresponding to the designated brand the budget amount has been stored.

According to the budget-management-data creating apparatus 100, upon acceptance of a notification instruction to the order management system 202 for any of the item categories for which the input has been confirmed, the budget amount of the item category related to the notification instruction may be notified to the order management system 202. Due to this configuration, at the time of creating the budget management data, the budget amount (the purchase budget) may be notified to the order management system 202 simultaneously, thereby enabling to improve the user-friendliness.

According to the budget-management-data creating apparatus 100, when the budget amount of the item category related to the notification instruction has been notified to the order management system 202, the mark indicating the notified budget amount may be displayed, associated with the item category related to the notification in question in the list of item categories. Due to this configuration, the user can intuitively determine for which item category of the item categories corresponding to the designated brand the budget amount has been notified to the order management system 202.

As described above, according to the budget-management-data creating apparatus 100, with regard to a designated brand, budget management data indicating weekly (or monthly) budgets for each of item categories for the fiscal year may be easily created.

The budget-management-data creating method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

However, according to the conventional techniques, it takes time and labor for weekly or monthly budget planning for each item category based on an annual business budget and the like.

According to an aspect of the present invention, creation of budget management data may be performed in a simplified manner.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A budget-management-data creating apparatus comprising:
- a display screen configured to accept designation of a brand and designation of a budget amount; and
- a processor configured to:
  - create monthly budget amounts for the brand by proportionally distributing the designated budget amount based on past sales records; and
  - automatically create a budget amount for each of a plurality of item categories by proportionally distributing the created monthly budget amounts based on the past sales records for each of the item categories registered associated with the designated brand,
- the display screen being further configured to:
  - display, in response to a display instruction for a budget amount of a certain item category from among the plurality of item categories, the budget amount of the certain item category and a list of the item categories; and display, upon acceptance, by the processor, of a predetermined operation with or without editing with respect to a budget amount of the certain item category, a mark indicating a confirmed input for the budget amount associated with the certain item category of the item categories included in the list of item categories corresponding to the brand.

2. The budget-management-data creating apparatus according to claim 1, wherein the display screen is further configured to receive a notification instruction to an order management system that evaluates a total order amount based on a notified budget amount for any of the item categories for which input has been confirmed, and wherein the processor is further configured to notify the order management system of the budget amount for an item category related to the notification instruction.

3. The budget-management-data creating apparatus according to claim 2, wherein the display screen is further configured to display a mark indicating that the budget amount has been associated with the item category related to the notification instruction, among item categories included in the list of item categories corresponding to the designated brand, after the order management system is notified of the budget amount.

4. The budget-management-data creating apparatus according to claim 1, wherein the processor is further configured to:

create weekly budget amounts for the brand by proportionally distributing the designated budget amount based on past sales records; and automatically create a budget amount for each of the item categories registered associated with the designated brand, by proportionally distributing the created weekly budget amounts, based on past sales records of each of the item categories.

* * * * *